US011900329B2

(12) United States Patent
Walsh et al.

(10) Patent No.: US 11,900,329 B2
(45) Date of Patent: Feb. 13, 2024

(54) MODULE-BASED SCHEDULE GENERATION

(71) Applicant: The Boeing Company, Chicago, IL (US)

(72) Inventors: Brian Donovan Walsh, Buda, TX (US); Matthew David Zentner, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 144 days.

(21) Appl. No.: 16/794,166

(22) Filed: Feb. 18, 2020

(65) Prior Publication Data

US 2021/0256482 A1    Aug. 19, 2021

(51) Int. Cl.
*G06Q 10/1093*  (2023.01)
*G06Q 10/10*  (2023.01)
*G06F 3/04847*  (2022.01)
*G06Q 50/28*  (2012.01)
*G06Q 50/04*  (2012.01)

(52) U.S. Cl.
CPC ..... *G06Q 10/1097* (2013.01); *G06F 3/04847* (2013.01); *G06Q 10/103* (2013.01); *G06Q 50/04* (2013.01); *G06Q 50/28* (2013.01)

(58) Field of Classification Search
CPC .. G06Q 10/1097; G06Q 10/103; G06Q 50/04; G06Q 50/28; G06F 3/04847
USPC ....................................................... 705/7.22
See application file for complete search history.

(56) References Cited

U.S. PATENT DOCUMENTS

| | | | | |
|---|---|---|---|---|
| 2010/0010856 | A1* | 1/2010 | Chua ................ | G06Q 10/06311 705/7.13 |
| 2014/0032256 | A1* | 1/2014 | Hess ..................... | G06Q 10/06 705/7.24 |
| 2014/0278819 | A1* | 9/2014 | Ramsey ........... | G06Q 10/06375 705/7.37 |
| 2020/0174459 | A1* | 6/2020 | Sasaki ............. | G05B 19/41895 |

OTHER PUBLICATIONS

"A decision aid for the selection and scheduling of software maintenance projects" to Ballou et al., Mar. 1, 1996 (Year: 1996).*
Dzeng et al., "Automatic schedule integration for highway projects," Automation in Construction, vol. 12, 2003, pp. 447-461.

* cited by examiner

*Primary Examiner* — Charles Guiliano
*Assistant Examiner* — Po Han Lee
(74) *Attorney, Agent, or Firm* — YEE & ASSOCIATES, P.C.

(57) ABSTRACT

A method, apparatus, system, and computer program product for generating a schedule for project. Modules are selected from a collection of modules. A module in the collection of modules has a group of milestones. A set of backoffs is selected for a set of the modules. A backoff in the set of modules for the module in the set of modules points to a milestone in another module in the modules. Dates are determined for the milestones based on time periods for the milestones, the set of backoffs, and a reference date for the project to form the schedule for the project.

21 Claims, 19 Drawing Sheets

MODULE-BASED SCHEDULE GENERATION

BACKGROUND INFORMATION

1. Field

The present disclosure relates generally to an improved computer system and, in particular, to a method, apparatus, system, and computer program product for generating schedules.

2. Background

In project management of products, schedules are used to manage work performed to complete the products. These products include, for example, a service, an aircraft, a manufacturing system, a building, a tool, or other suitable types of products.

A schedule includes a listing of milestones for the project. This data can also include a list of activities or tasks to be performed as well as deliverables.

Various tools are available for managing project schedules. For example, a waterfall methodology can breakdown project activities in a project into linear sequential phases. With this methodology, entries are made task-by-task. This type of methodology tends to be time-consuming to create and maintain.

Another approach involves using templates. Templates contain milestones and standard flows for the milestones. A template can be applied to a project when a target complete date is selected. The selection of the target complete date results in dates being calculated for milestones in the project.

However, for teams working on projects in which the teams have variability in day-to-day work, these types of boilerplate templates can become difficult to use because unique scenarios based on variability can require a new template. Further, the templates are often created to have milestones that take into account a worst-case scenario for a project. Milestones can then be culled out and removed from those templates when a worst-case scenario is absent in the project. Identifying and making changes can make using templates more difficult and time-consuming than desired.

SUMMARY

An embodiment of the present disclosure provides a schedule generation system comprising a computer system and a scheduler in the computer system. The scheduler is configured to receive a selection of modules for a project, wherein a module in the modules includes a group of milestones; receive a set of backoffs, wherein a backoff in the set of backoffs is a pointer that points one module to a milestone in another module in the modules; receive a reference date for the schedule; and create the schedule from the modules based on selection of modules, the set of backoffs, and the reference date.

Another embodiment of the present disclosure provides a schedule generation system comprising a display system, a computer system, and a client in the computer system. The client is configured to transmit, to a server in the computer system, selection data indicative of a selection of modules for a project, wherein the modules include respective groups of milestones. The client is also configured to transmit, to the server, backoff data indicative of a set of backoffs. A backoff in the set of backoffs is a pointer that points one module to a milestone in another module in the modules. The client is configured to transmit, to the server, a reference date. The client is configured to receive, from the server, a schedule that provides due dates for when the respective groups of milestones are to be completed. The schedule is generated by the server based on the selection of the module, the set of backoffs, and the reference date.

Yet another embodiment of the present disclosure provides a method for generating a schedule for a project. Modules are selected, by a computer system, from a collection of modules. A module in the collection of modules has a group of milestones. A set of backoffs is selected, by the computer system, for a set of the modules. A backoff in the set of modules for the module in the set of modules points to a milestone in another module in the modules. Dates are determined, by the computer system, for the milestones based on time periods for the milestones, the set of backoffs, and a reference date for the project to form the schedule for the project.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
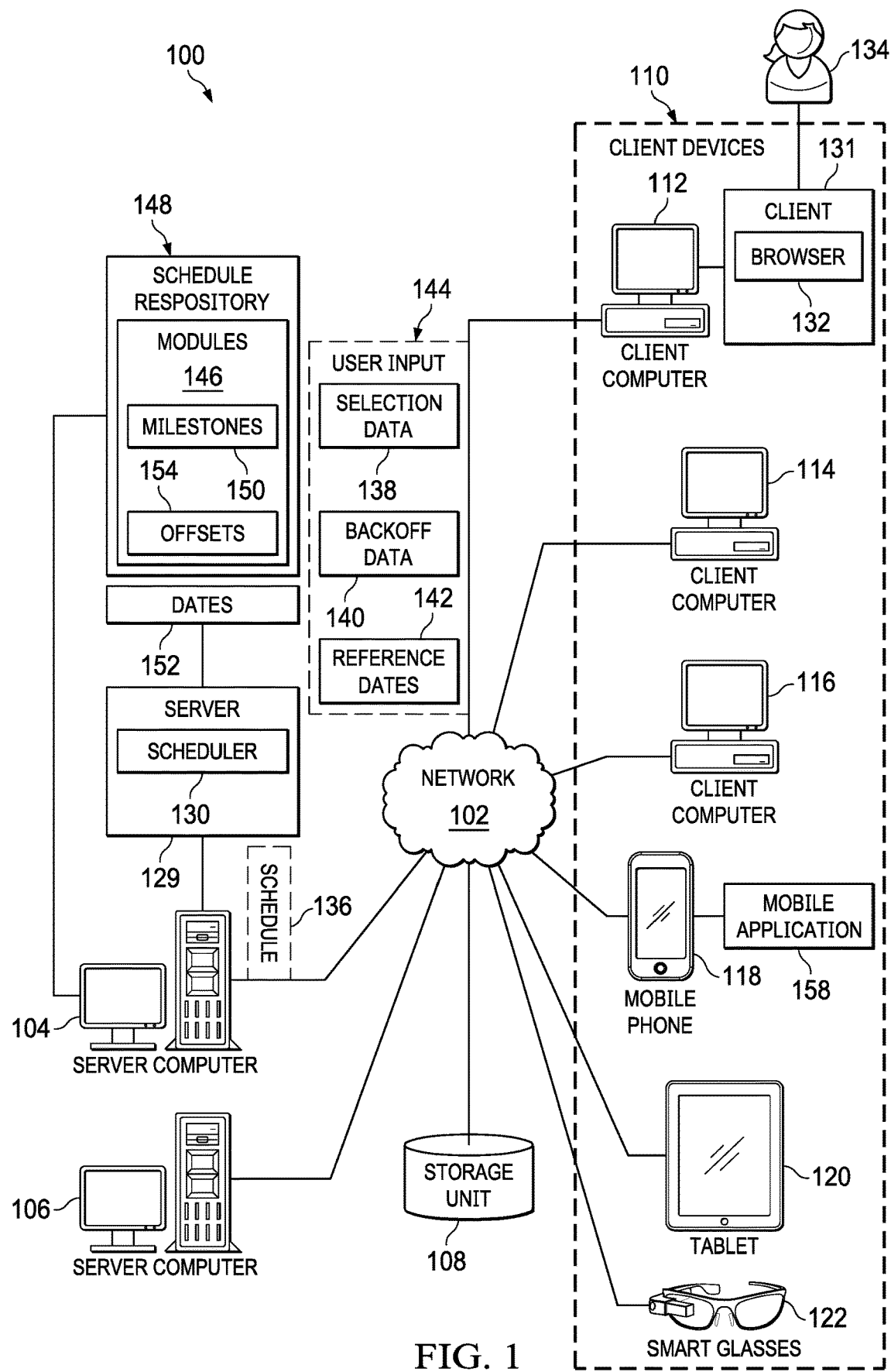
FIG. 1 is a pictorial representation of a network of data processing systems in which illustrative embodiments may be implemented.

The illustrative embodiments recognize and take into account one or more different considerations. For example, the illustrative embodiments recognize and take into account that current techniques for generating schedules are more rigid than desired. The illustrative examples also recognize and take into account that current techniques require human operators to manually calculate hundreds or thousands of steps needed to complete a project such as certification of an aircraft or other product.

The illustrative embodiments recognize and take into account that using templates can be more difficult than desired. For example, the illustrative embodiments recognize and take into account that comparing schedules and obtaining metrics from different programs for similar products can be more difficult than desired because milestones can have different meanings from project-to-project and between different product teams.

Thus, the illustrative embodiments recognize and take into account that one solution involves selecting a limited number of parameters to select templates. However, the illustrative embodiments recognize and take into account that with the limited number of parameters, the templates can still be more rigid to create to cover different situations. The illustrative embodiments recognize and take into account that many templates only take into account basic milestones and require much time and effort to tailor those templates to a particular project.

The illustrative embodiments recognize and take into account that a schedule can be manually created for a particular project without using a particular scheduling tool. The illustrative embodiments recognize and take into account that this type of process is tedious and prone to errors. The illustrative embodiments recognize and take into account that a manually-created schedule can be unrealistic to manage because of the data changes that may occur frequently during the performance of the project.

It would be desirable to have a method and apparatus that take into account at least some of the issues discussed above, as ell as other possible issues. For example, it would be desirable to have a method and apparatus that overcome a technical problem with efficiently generating schedules that are as accurate as desired as compared to conventional techniques for generating schedules.

Thus, the illustrative embodiments provide a method, apparatus, system, and computer program product for generating schedules. In the illustrative embodiments, modules are defined for a particular scenario or stage in a project. These modules can be referred to as micro-schedule templates. In the illustrative examples, the modules can be connected to each other through milestones in the modules. Further, in the illustrative embodiments, each module can be independent of other modules. With the hierarchy of modules, the illustrative examples enable a selection of the reference date to be used to drive all of the dates for milestones within this hierarchy of modules. The reference date can be a start date or an end date for the project. The reference date can be some other user-selected date depending on the implementation.

For example, a schedule generation system can comprise a computer system and a scheduler in the computer system. The scheduler can be configured to receive a selection of modules for a project in which a module in the modules includes a group of milestones. The scheduler can be configured to receive a set of backoffs. A backoff in the set of backoffs is a pointer that points one module to a milestone in another module in the modules. The scheduler can be configured to receive a reference date for the schedule, wherein the reference date indicates when the project is to begin or be completed. The scheduler can be configured to create the schedule from the modules based on a selection of modules, the set of backoffs, and the reference date.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 can include connections such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and/or applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102, in which network 102 is the communications media for these network devices. Some or all of client devices 110 can form an Internet-of-things (IoT) in which these physical devices can connect to network 102 and exchange information with each other over network 102.

Client devices 110 are clients to server computer 104 in this example. Network data processing system 100 can include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also can be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list can be needed. In other words, "at least one of" means any combination of items and number of items can be used from the list, but not all of the items in the list are required. The item can be a particular object, a thing, or a category.

For example, without limitation, "at least one of item A, item B, or item C" can include item A, item A and item B, or item B. This example also can include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, network data processing system 100 can operate to generate schedules for projects. In this illustrative example, server 129 in the form of scheduler 130 is located in server computer 104, and browser 132 is located in client computer 112. Human operator 134 can use client 131 in the form of browser 132 in client computer 112 to interact with scheduler 130 in server computer 104 to generate schedule 136. Schedule 136 is generated for a project.

As depicted, client 131 in the form of browser 132 is software and is a client to server 129 in the form of scheduler 130. Browser 132 is a software application for accessing information on a network such as the World Wide Web on the Internet. When a user requests a particular website, browser 132 retrieves the necessary content from a web server and then displays the resulting web page on the user's device. In this example, the pages and information can be retrieved from scheduler 130 for use in creating schedule 136.

As depicted, human operator 134 can send selection data 138, backoff data 140, and a set of reference dates 142 to scheduler 130 from browser 132 in user input 144. This information in user input 144 is used by scheduler 130 to generate schedule 136.

In this illustrative example, selection data 138 is indicative of a selection of modules 146 for a project. Modules 146 can be located in schedule repository 148 in server computer 104. Modules 146 have milestones 150.

As depicted, modules 146 can be linked to each other using pointers identified in backoff data 140. A backoff in a module is a pointer that points the module to a milestone in another module. That pointer links the two modules to each other.

In the illustrative example, milestones 150 in modules 146 have offsets 154. For example, offsets 154 for milestones 150 calculate dates identified for milestones 150. Offsets 154 can be days in this example.

In this illustrative example, dates 152 for milestones 150 can be calculated by scheduler 130 from offsets 154 made to a set of reference dates 142. The set of reference dates 142 can be at least one of a start date or a target date for completion of the project in this particular example. A reference date can be, for example, a date received in a user input such as a target date to complete a project. In the illustrative example, the date for the milestone pointed to by a backoff for a module can be a source date for the offsets in a module.

When dates 152 are calculated for schedule 136, scheduler 130 can send schedule 136 to browser 132 in client computer 112 and display to human operator 134. Human operator 134 can make changes such that dates 152 in schedule 136 are recalculated by scheduler 130. Once any changes are completed, schedule 136 can be published in final form for use in a project.

Although this illustrative example depicts using browser 132 in client computer 112 to interact with scheduler 130 to generate schedule 136, other types of software can be used in addition to or in place of browser 132. For example, when human operator 134 uses mobile phone 118, human operator 134 can use mobile application 158 instead of a browser in mobile phone 118. As another illustrative example, schedule repository 148 can be located in storage unit 108. In another example, browser 132 can run in tablet computer 120.

Figure 2:
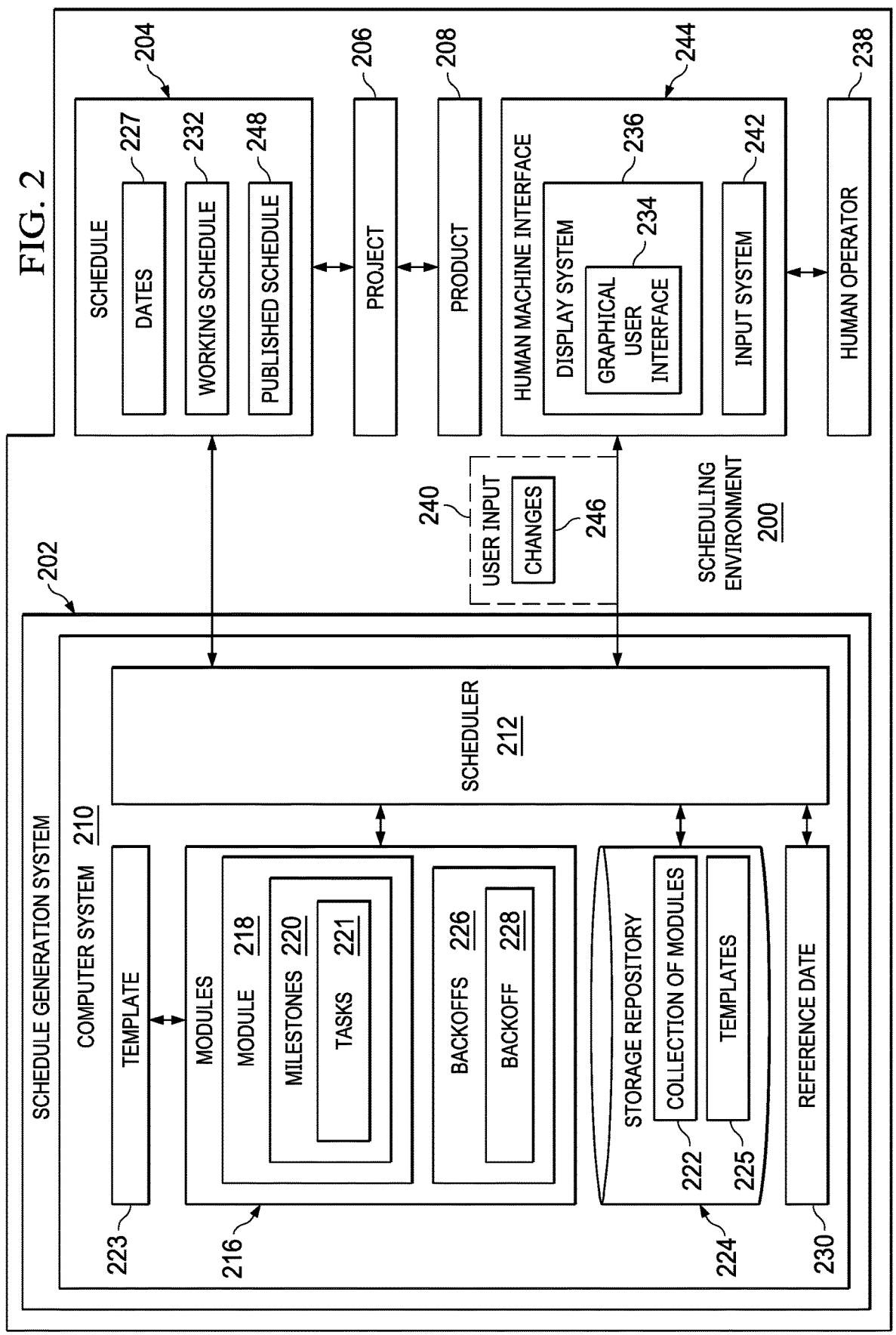
FIG. 2 is an illustration of a block diagram of a scheduling environment in accordance with an illustrative embodiment.

With reference now to FIG. 2, an illustration of a block diagram of a scheduling environment is depicted in accordance with an illustrative embodiment. In this illustrative example, scheduling environment 200 includes components that can be implemented in hardware such as the hardware shown in network data processing system 100 in FIG. 1.

In the illustrative example, schedule generation system 202 in scheduling environment 200 can operate to generate schedule 204. As depicted, schedule 204 can be used to perform project 206.

Project 206 can take different forms. In the illustrative example, project 206 can be manufacturing product 208, certifying product 208 as meeting a standard, performing maintenance, and/or other projects that are suitable for performance using schedules.

The project can be for product 208, which can take a number of different forms. For example, product 208 can be one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, a building, an engine, a monument for an interior of an aircraft, a braking system, a control system, a fuel system, a hydraulic system, a control surface, a skin panel, a wheel, and a fuel tank.

In this illustrative example, schedule generation system 202 comprises computer system 210 and scheduler 212. As depicted, scheduler 212 is located in computer system 210. Scheduler 130 in FIG. 1 is an example of scheduler 212.

Scheduler 212 can be implemented in software, hardware, firmware, or a combination thereof. When software is used, the operations performed by scheduler 212 can be implemented in program code configured to run on hardware, such as a processor unit. When firmware is used, the operations performed by scheduler 212 can be implemented in program code and data and stored in persistent memory to run on a processor unit. When hardware is employed, the hardware can include circuits that operate to perform the operations in scheduler 212.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

In this illustrative example, scheduler 212 is configured to perform a number of different operations in creating schedule 204. For example, scheduler 212 can receive a selection of modules 216 for project 206.

Modules 216 are distinct groupings of information used to create schedule 204. As depicted, module 218 in modules 216 includes a group of milestones 220. Milestones 220 are events that can be used to identify changes or stages in project 206 that are to be reached as part of performing project 206. Modules 216 can also include other information. For example, module 218 in modules 216 can also include tasks 221 for the group of milestones 220.

In this illustrative example, modules 216 can be selected from collection of modules 222 stored in storage repository 224. Collection of modules 222 is modules from which modules 216 can be selected for use in creating schedule 204.

Further, modules in collection of modules 222 can be selected to form templates 225. For example, modules 216 selected from collection of modules 222 for use in creating schedule 204 can be referred to as template 223. Modules 216 as they relate to each other with backoffs or to external events can form template 223. This grouping of modules 216 into template 223 can be stored as part of templates 225 for future use.

Storage repository 224 is a location where collection of modules 222 is located. Storage repository 224 that can take a number of different forms. For example, storage repository 224 can be at least one of a cloud storage, a folder in a file directory, a database, a linked list, or other suitable mechanisms for organizing information in computer system 210.

As depicted, scheduler 212 receives a set of backoffs 226. In the illustrative example, backoff 228 in the set of backoffs 226 is a pointer that points one module to a milestone in another module in modules 216. This pointer links the two modules to each other. As a result, backoffs 226 can be used to define relationships between modules 216.

Scheduler 212 receives reference date 230 for schedule 204. In the illustrative example, reference date 230 is used to calculate dates for milestones 220 and indicates a date of when project 206 is to be completed or a date or when project 206 is to begin.

In the illustrative example, scheduler 212 creates schedule 204 from modules 216 based on selection of modules 216, the set of backoffs 226, and reference date 230. Schedule 204 includes dates 227 for milestones 220 for modules 216 selected for schedule 204.

As depicted, schedule 204 can be working schedule 232 in which working schedule 232 can be reviewed and changed if needed before being used for project 206. In this illustrative example, scheduler 212 displays working schedule 232 on graphical user interface 234 in display system 236 to human operator 238.

Display system 236 is a physical hardware system and includes one or more display devices on which graphical user interface 234 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Human operator 238 is a person that can interact with graphical user interface 234 through user input 240 generated by input system 242 for computer system 210. Input system 242 is a physical hardware system and can be selected from at least one of a mouse, a keyboard, a trackball, a touchscreen, a stylus, a motion-sensing input device, a cyber glove, or some other suitable type of input device. Display system 236 and input system 242 form human machine interface (HMI) 244 in this illustrative example.

As depicted, scheduler 212 can receive user input 240 including a set of changes 246 to working schedule 232 displayed on graphical user interface 234 in display system 236. As depicted, the set of changes 246 can be at least one of adding a new module, removing a module, removing a milestone, changing a milestone order, changing a time period for the milestone, changing a selected backoff, changing a buffer, or changing a reference date.

Scheduler 212 can update working schedule 232 based on the set of changes 246 and display working schedule 232 with the set of changes 246. In other words, dates 227 in working schedule 232 can be updated based on the set of changes 246.

In the illustrative example, scheduler 212 can publish working schedule 232 as published schedule 248 when user input 240 is received indicating changes 246 to working schedule 232 is complete or no changes are needed to working schedule 232. Published schedule 248 is a form of schedule 204 that can be used to perform project 206.

Figure 3:
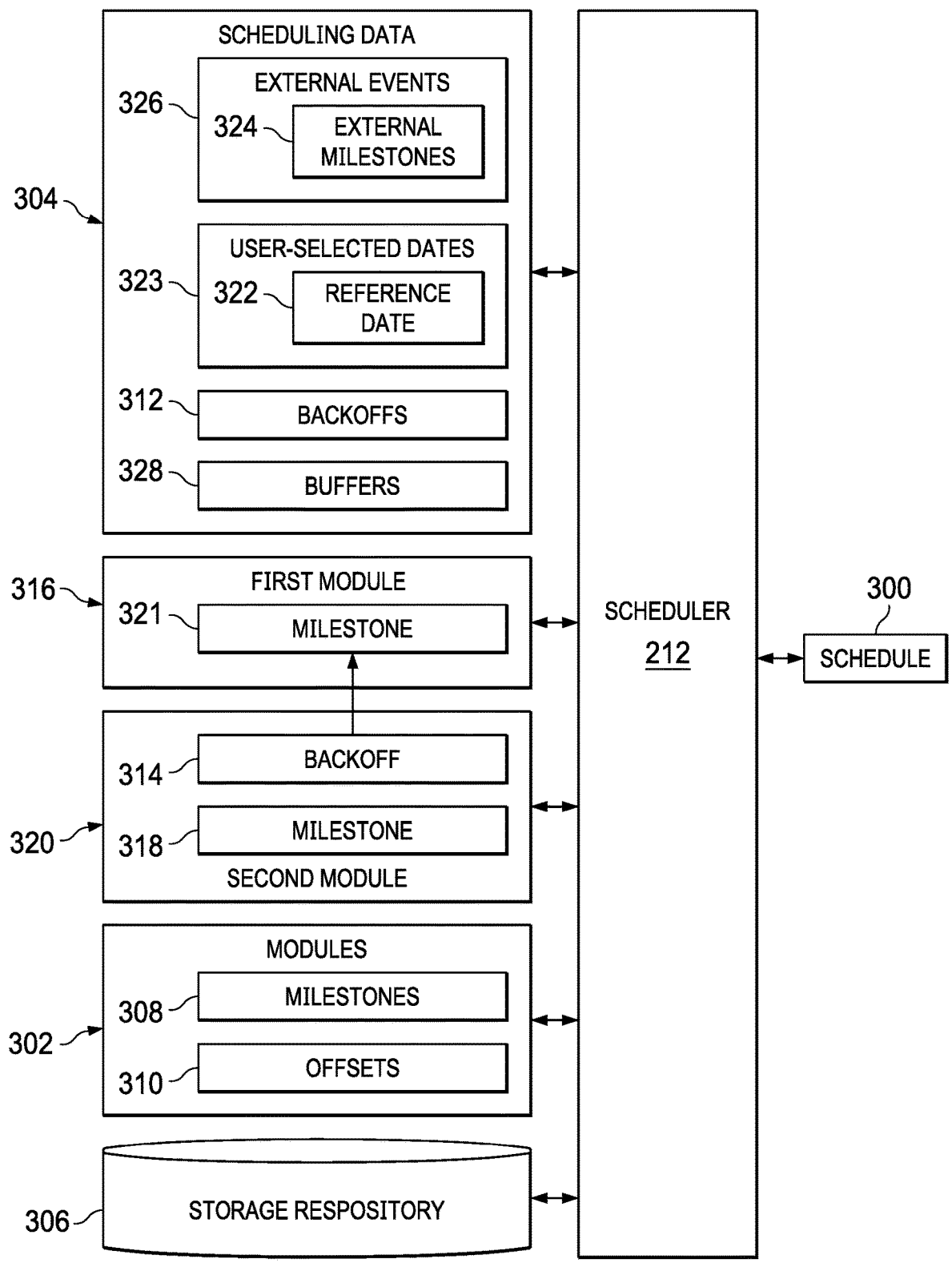
FIG. 3 is a more detailed illustration of a block diagram of data used in creating a schedule from modules in accordance with an illustrative embodiment.

Turning next to FIG. 3, a more detailed illustration of a block diagram of scheduling data used in creating a schedule from modules is depicted in accordance with an illustrative embodiment. In the illustrative examples, the same reference numeral can be used in more than one figure. This reuse of a reference numeral in different figures represents the same element in the different figures.

In the depicted example, scheduler 212 creates schedule 300 using modules 302 and scheduling data 304. Modules 302 can be retrieved from storage repository 306.

In this illustrative example, each module can represent a scenario which could take place on a project containing standardized work. By building a scenario for each part of a project, a module can be used in a project that fits the scenario. As a result, the illustrative example avoids building a worst-case scenario as a starting point and modifying the schedule from the worst-case scenario to fit the current project.

As depicted, modules 302 include milestones 308. Each module in modules 302 includes one or more of milestones 308. Milestones 308 have offsets 310. Each milestone in milestones 308 has an offset in offsets 310. The offset is a time period used to calculate a date for a milestone. In this example, an offset in offsets 310 is an integer value that represents a time to a zero offset. The zero offset is a point in time from which all milestones in a module can be calculated. The offset can be, for example, dates, hours, minutes, or some other suitable period of time.

In the illustrative example, modules 302 can be linked to each other as part of the process of forming schedule 300. Modules 302 can be linked to each other using scheduling data 304 such as backoffs 312. As depicted, backoffs 312 are pointers in this example. For example, backoff 314 in second module 320 points to milestone 321 in first module 316.

As depicted, scheduling data 304 can also include a set of user-selected dates 323. Reference date 322 is an example of user-selected dates 323. Reference date 322 can be an end or completion date for schedule 300. This date can be a user-selected date that is used to determine dates for milestones 308. Reference date 322 can also be a start date for schedule 300 or any other reference date for a milestone in milestones 308.

As another illustrative example, scheduling data 304 can also include a set of external events 326. The set of external events 326 can be, for example, external backoffs, milestones, or other events that have dates associated with them.

In this example, external milestones 324 in the set of external events 326 represent a milestone in a project outside of modules 302 for schedule 300. External milestones 324 can be, for example, a shop complete date, a product delivery, or some other milestone outside of milestones 308 for modules 302.

The date for this milestone can be a date from which other dates are calculated for milestones 308 in modules 302 in schedule 300. For example, first module 316 can include a pointer to an external event in the set of external events 326 for a milestone in milestones 308. This pointer is to an external event in the form of a date that can be used to calculate dates for a milestone in milestones 220 in module 218 pointing to an external event. This external event can also be external milestone 317.

In other words, dates for some milestones in a module can be calculated using a backoff while dates for other milestones can be calculated using the date for an external event. As depicted, reference date 322 is a date for a project and is an example of an external event. For example, reference date 322 can be a start date or end date project. Milestones 308 in modules 302 for schedule 300 can use an external date from an external event to calculate dates for milestones 308 based on offsets 310 for milestones 308.

In yet another illustrative example, scheduling data 304 can also include a set of buffers 328. The set of buffers 328 are for milestones 308. The set of buffers 328 can be used to add additional offset dates for milestones 308 when calculating dates for milestones 308. A buffer indicates a period of time by which the group of milestones 220 in module 218 can be offset from a backoff. The additional offset can add or delete a period of time for all milestones in a module. A buffer can be, for example, days, hours, weeks, or some other period of time. In the depicted example, each module in modules 302 can have a buffer.

Figure 4:
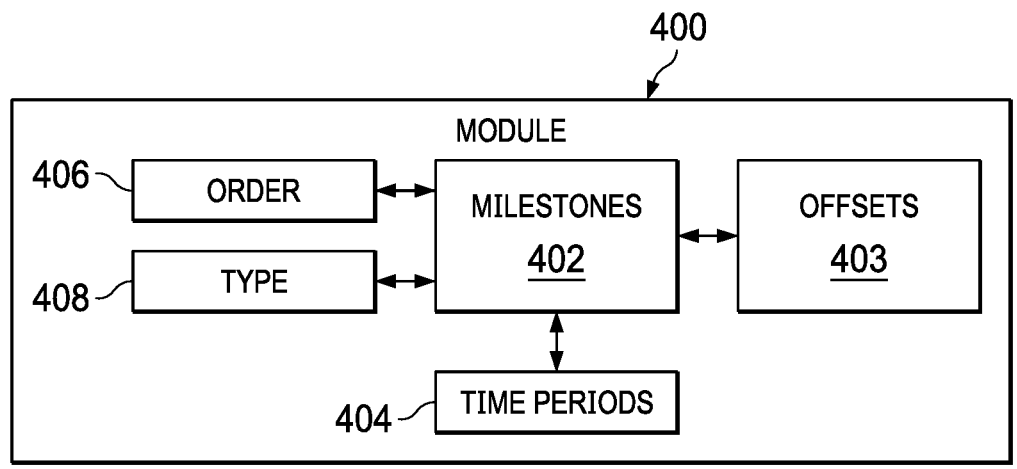
FIG. 4 is an illustration of a block diagram of a module in accordance with an illustrative embodiment.

With reference next to FIG. 4, an illustration of a block diagram of a module is depicted in accordance with an illustrative embodiment.

In the illustrative example, module 400 is an example of a module in modules 216 in FIG. 2. Module 400 comprises a group of milestones 402 and a group of time periods 404 for milestones 402. The group of milestones 402 has order 406 within module 400.

Further, each milestone in the group of milestones 402 has type 408 in this illustrative example. As depicted, all of milestones 402 in module 400 have a same type 408. In the illustrative example, type 408 is one of fabrication, assembly, inspection, testing, finish, shipping, and other suitable types for milestones.

In the illustrative example, module 400 can also include other information. For example, module 400 can also include a group of offsets 403 for the group of milestones 402. Each milestone in the group of milestones 402 can have an offset from the group of offsets 403.

As used herein, "a group of," when used with reference to items, means one or more items. For example, "a group of modules 216" is one or more of modules 216.

A time period in the group of time periods 404 represents a relative time for performing the milestone. In the illustrative example, the group of time periods 404 is one of offsets 403 to dates for the group of milestones 402 or durations of time for the group of milestones 402. With offsets 403 or durations in the group of time periods 404 for the group of milestones 402, the time needed to complete module 400 can be determined.

Figure 5:
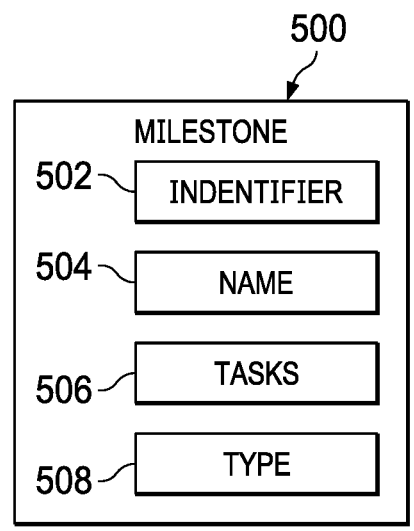
FIG. 5 is an illustration of a block diagram of a milestone in accordance with an illustrative embodiment.

With reference next to FIG. 5, an illustration of a milestone is depicted in accordance with an illustrative embodiment. In this illustrative example, milestone 500 is an example of milestones 220 in FIG. 2 and milestones 402 in FIG. 4.

Milestone 500 includes a number of different fields: identifier 502, name 504, a group of tasks 506, and type 508.

Identifier 502 is a unique identifier in this illustrative example. As a result, a milestone with the same name, concept, and type can be placed into multiple modules using different identifiers to uniquely identify that milestone in a particular module.

Name 504 is the name of milestone 500 that a human operator can use when viewing a display of milestone 500. A group of tasks 506 is one or more of tasks that are to be performed to reach milestone 500. The group of tasks 510 can be, for example, at least one of assembling components to form a subsystem, forming a hole, installing a fastener, machining a part, applying a coating to a part, inspecting and assembly, creating a computer-aided design model, performing a finite element analysis, or other suitable tasks.

In this illustrative example, type 508 is a type for milestone 500. Type 508 indicates the type of module that milestone 500 can be placed in when grouping milestones into modules. For example, type 508 can be one of fabrication, assembly, inspection, testing, finish, shipping, and other suitable types for milestone 500.

In one illustrative example, one or more technical solutions are present that overcome a technical problem with generating schedules that are as accurate as desired as compared to current techniques for generating schedules. As a result, one or more technical solutions can provide a technical effect of efficiently generating schedules in a manner that overcomes the issues with current techniques. Computer system 210 can be configured to perform at least one of the steps, operations, or actions described in the different illustrative examples using software, hardware, firmware, or a combination thereof.

As a result, computer system 210 operates as a special purpose computer system in which scheduler 212 in computer system 210 enables generating a schedule for a project more efficiently as compared to current scheduling techniques. In particular, scheduler 212 transforms computer system 210 into a special purpose computer system as compared to currently available general computer systems that do not have scheduler 212.

In the illustrative example, the use of scheduler 212 in computer system 210 integrates processes into a practical application for generating a schedule that increases the performance of computer system 210. In other words, scheduler 212 in computer system 210 is directed to a practical application of processes integrated into scheduler 212 in computer system 210 that selects modules; selects backoffs for the models in which the backoffs link the modules to each other; and determines dates for milestones in the models to form a schedule for the project. In one illustrative example, the use of these modules with backoffs improves the performance of computer system 210 in reducing the amount of storage needed in computer system 210. With the use of modules, the amount of storage needed for creating schedules is reduced as compared to current techniques using templates.

The illustration of scheduling environment 200 in FIG. 2 is not meant to imply physical or architectural limitations to the manner in which an illustrative embodiment can be implemented. Other components in addition to or in place of the ones illustrated can be used. Some components can be unnecessary. Also, the blocks are presented to illustrate some functional components. One or more of these blocks can be combined, divided, or combined and divided into different blocks when implemented in an illustrative embodiment.

For example, milestone 500 in FIG. 5 can include other information in addition to or in place of the fields depicted for milestone 500. For example, milestone 500 can also include an order number identifying the order in which the milestone is to be placed in a module or with respect to other milestones. As another example, reference date 230 in FIG. 2 is a reference date that indicates a date of when project 206 is to be completed. In other examples, a reference date such a start date for project 206 can be used.

Turning next to FIGS. 6-10, illustrations of data structures used in creating a schedule are depicted in accordance with an illustrative embodiment.

Figure 6:
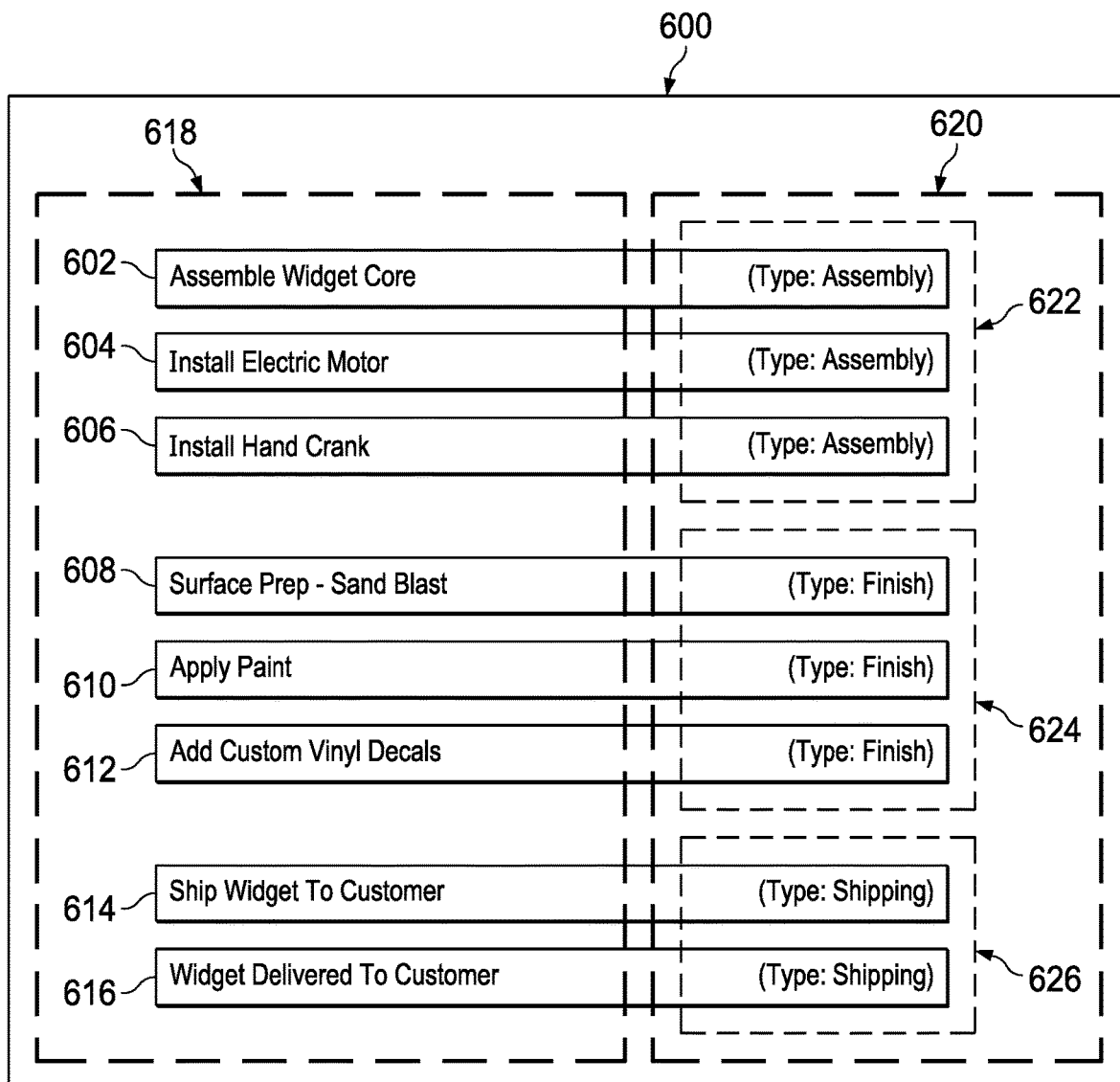
FIG. 6 is an illustration of milestones that can be placed into modules in accordance with an illustrative embodiment.

With reference first to FIG. 6, an illustration of milestones that can be placed into modules is depicted in accordance with an illustrative embodiment. As depicted, milestones 600 are examples of milestones 150 in FIG. 1, milestones 220 in FIG. 2, milestones 308 and FIG. 3, and milestones 402 in FIG. 4.

As depicted, milestones 600 are examples of milestones that can be used in a project for manufacturing a product. In this illustrative example, milestones 600 are created for each milestone in a manufacturing process for manufacturing widgets. Milestones 600 include assemble widget core 602, install electric motor 604, install hand crank 606, surface prep—sand blast 608, apply paint 610, add custom vinyl decals 612, ship widget to customer 614, and widget delivered to customer 616. In this illustrative example, milestones 600 have descriptions 618 and types 620.

As depicted, types 620 are assembly 622, finish 624, and shipping 626. These types correspond to areas of sub-processes for manufacturing a product in this example. The particular types used for milestones 600 can be different from those illustrated in other illustrative examples.

With milestones 600, scenarios can be created. The scenarios can be embodied in modules with each module comprising one or more milestones from milestone 600.

Figure 7:
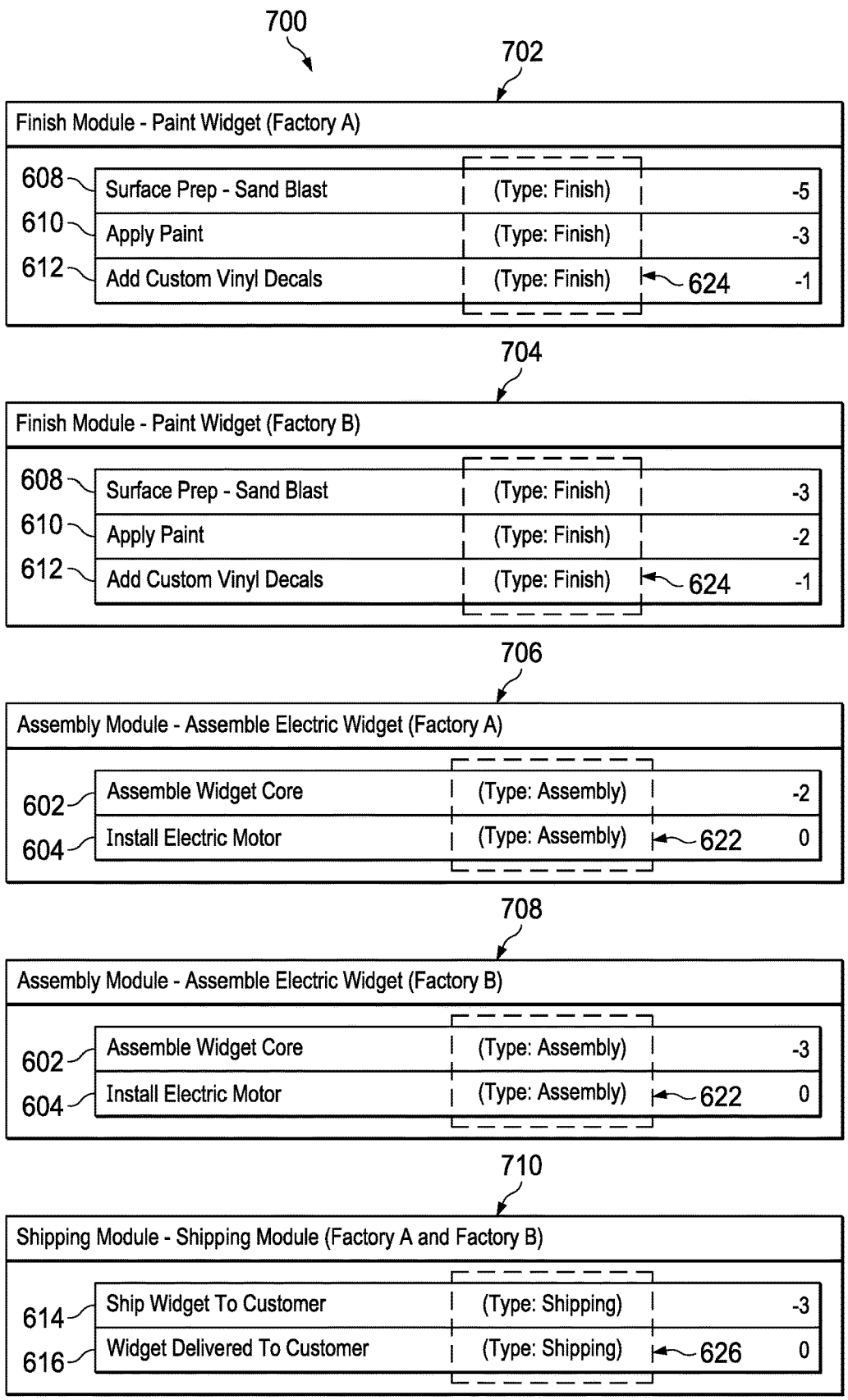
FIG. 7 is an illustration of modules in accordance with an illustrative embodiment.

With reference next to FIG. 7, an illustration of modules is depicted in accordance with an illustrative embodiment. As depicted, modules 700 are examples of modules 146 in FIG. 1, modules 216 in FIG. 2, modules 302 in FIG. 3, and module 400 in FIG. 4.

In this illustrative example, modules 700 have been generated to produce products in factories, Factory A and Factory B. As depicted, modules 700 comprise finish module 702, finish module 704, assembly module 706, assembly module 708, and shipping module 710. In this illustrative example, finish module 702 and assembly module 706 are tailored to Factory A while finish module 704 and assembly module 708 are tailored to Factory B. Shipping module 710 is the same for both factories in this example.

As illustrated in the depicted example, modules 700 are comprised of milestones 600 from FIG. 6. For example, both finish module 702 and finish module 704 include the following milestones: service prep—sand blast 608, apply paint 610, and add custom vinyl decals 612.

In this illustrative example, Factory A allows two days between milestones while Factory B allows one day between milestones. The difference in the milestones is taken into account using offsets to the milestones in these modules.

For example, in finish module 702, service prep—sand blast 608 has an offset of −5, apply paint 610 has an offset of −3, and add custom vinyl decals 612 has an offset of −1. In finish module 704, service prep—sand blast 608 has an offset of −3, apply paint 610 has an offset of −2, and add custom vinyl decals 612 has an offset of −1.

Both assembly module 706 for Factory A and assembly module 708 for Factory B have assemble widget core 602 and install electric motor 604 as milestones. As depicted, the offsets for any given milestone can vary between modules. For example, in assembly module 706, assemble widget core 602 has an offset of −2 and install electric motor 604 has an offset of 0. In assembly module 708, assemble widget core 602 has an offset of −3 and install electric motor 604 has an offset of 0.

Figure 8:
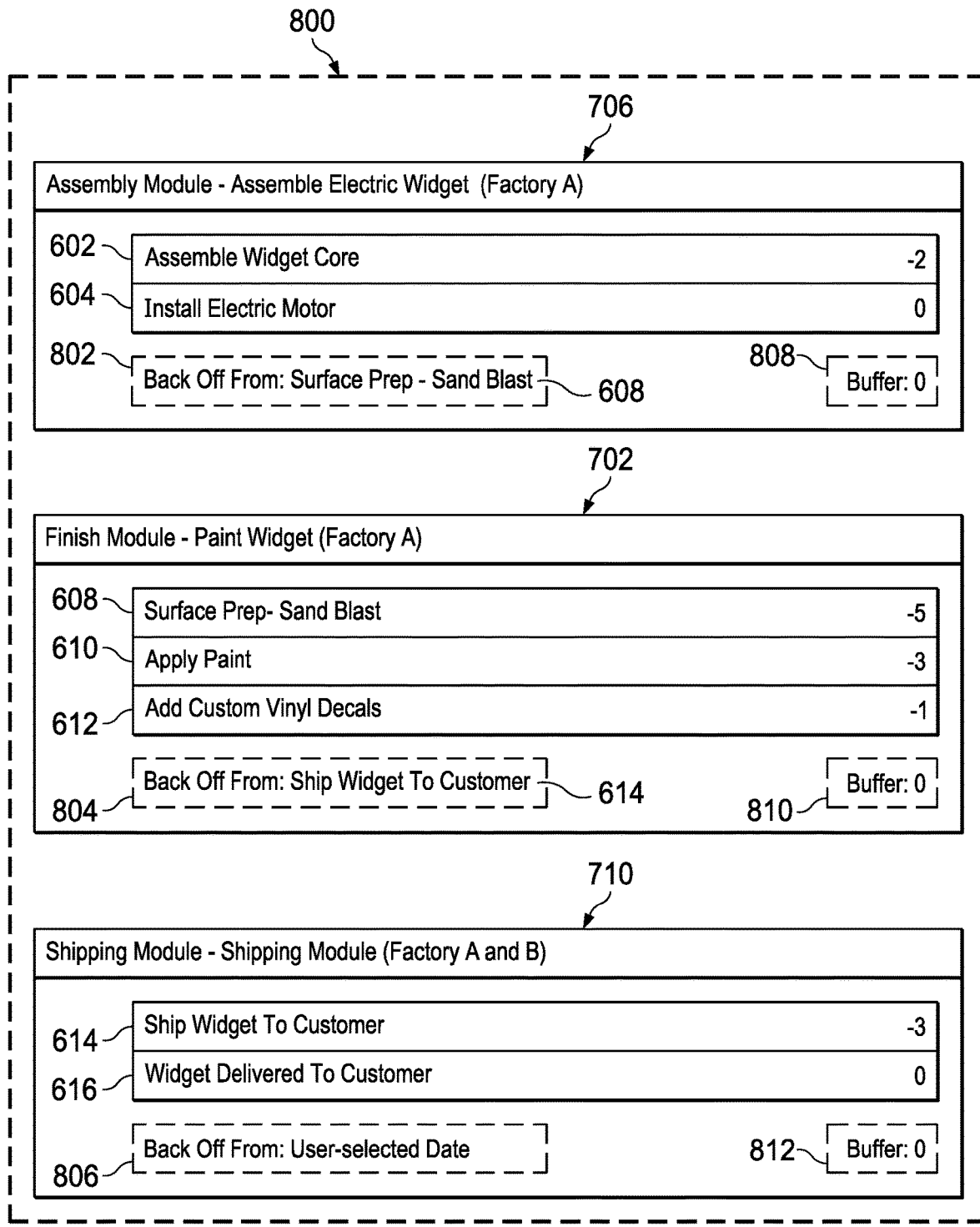
FIG. 8 is an illustration of a template formed from modules in accordance with an illustrative embodiment.

Turning next to FIG. 8, an illustration of a template formed from modules is depicted in accordance with an illustrative embodiment. As depicted, template 800 is formed from assembly module 706, finish module 702, and shipping module 710.

These modules are connected to each other using backoffs that provide links or relationships between the modules. Each backoff can be used to determine how dates in a module should be calculated. For example, a module can have a backoff that points to a milestone in another module in the template. Further, the module can have dates calculated from an external source such as an external event or from a date input by a human operator.

In this illustrative example, assembly module 706 has backoff 802 that points to surface prep—sand blast 608 in finish module 702. Finish module 702 has backoff 804 that points to ship widget to customer 614 in shipping module 710. In this illustrative example, shipping module 710 has backoff 806 which points to a user-selected date. As depicted, backoff 806 can include the user-selected date or can have a pointer to the location of the date. This date can be a reference date for an event such as a desired completion date for the project performed using a schedule generated from template 800.

Further, values for buffers are selected for these modules. As depicted, assembly module 706 has buffer 808 with a value of zero; finish module 702 has buffer 810 with a value of zero; and shipping module 710 has buffer 812 with a value of zero.

Figure 9:
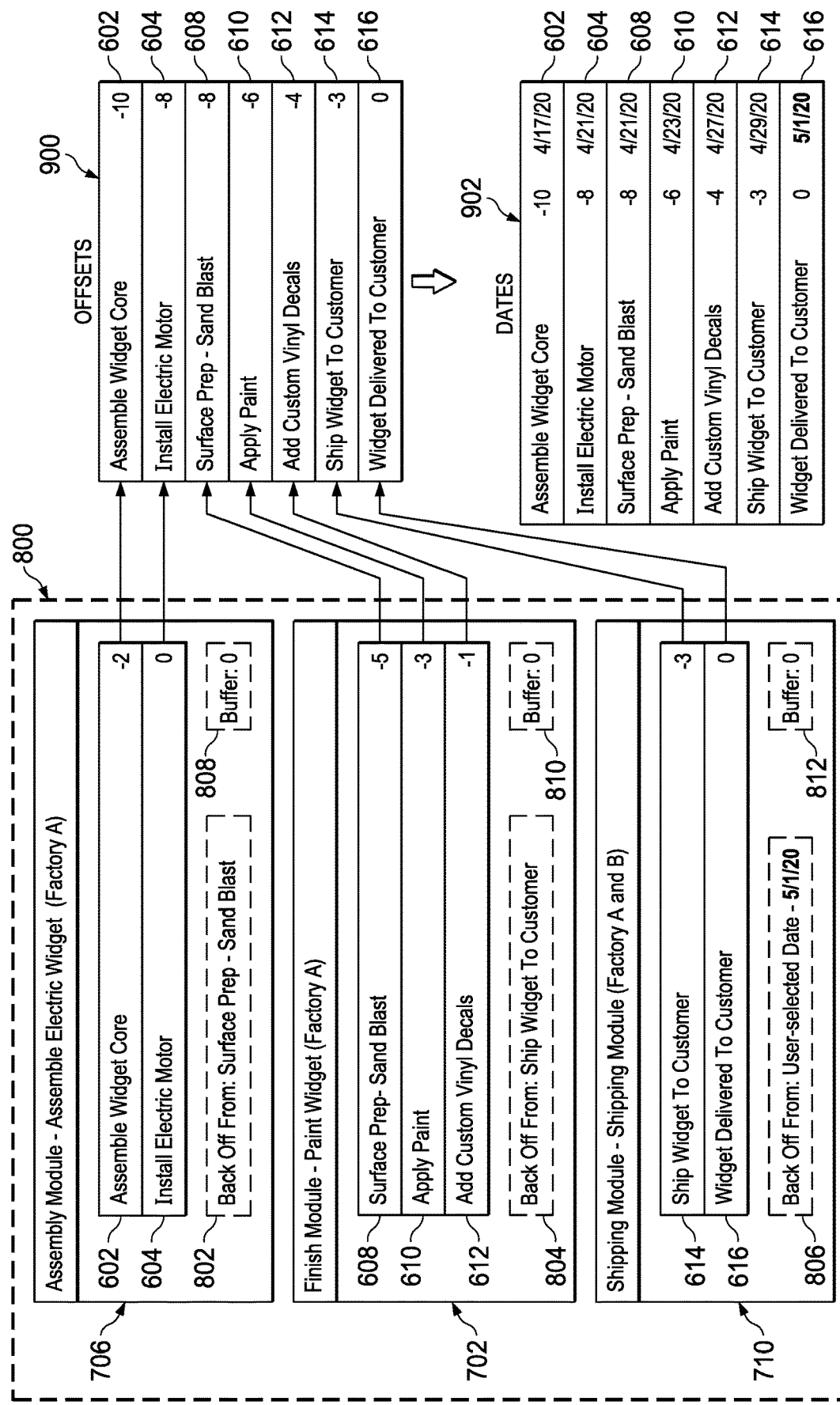
FIG. 9 is an illustration of a process for generating a schedule in accordance with an illustrative embodiment.

With reference next to FIG. 9, an illustration of a process for generating a schedule is depicted in accordance with an illustrative embodiment. In this illustrative example, template 800 is selected for use to generate a schedule. In this example, backoff 806 has a date of May 1, 1920. In this illustrative example, assembly module 706 has buffer 808 with an offset of zero; finish module 702 has buffer 810 without an offset of zero; and shipping module 710 has buffer 812 with a value of zero.

With the backoffs and buffers set, offsets 900 are calculated (e.g., by scheduler 130) for the milestones in template 800. These offsets or the milestones are relative offsets based on the order of the modules in template 800. In this example, offsets 900 are relative to widget delivered to customer 616 in shipping module 710.

From offsets 900, dates 902 are calculated (e.g., by scheduler 130) for each milestone using the date 5/1/20 entered for backoff 806. In this illustrative example, dates 902 are calculated in standard business days, ignoring weekends.

Figure 10:
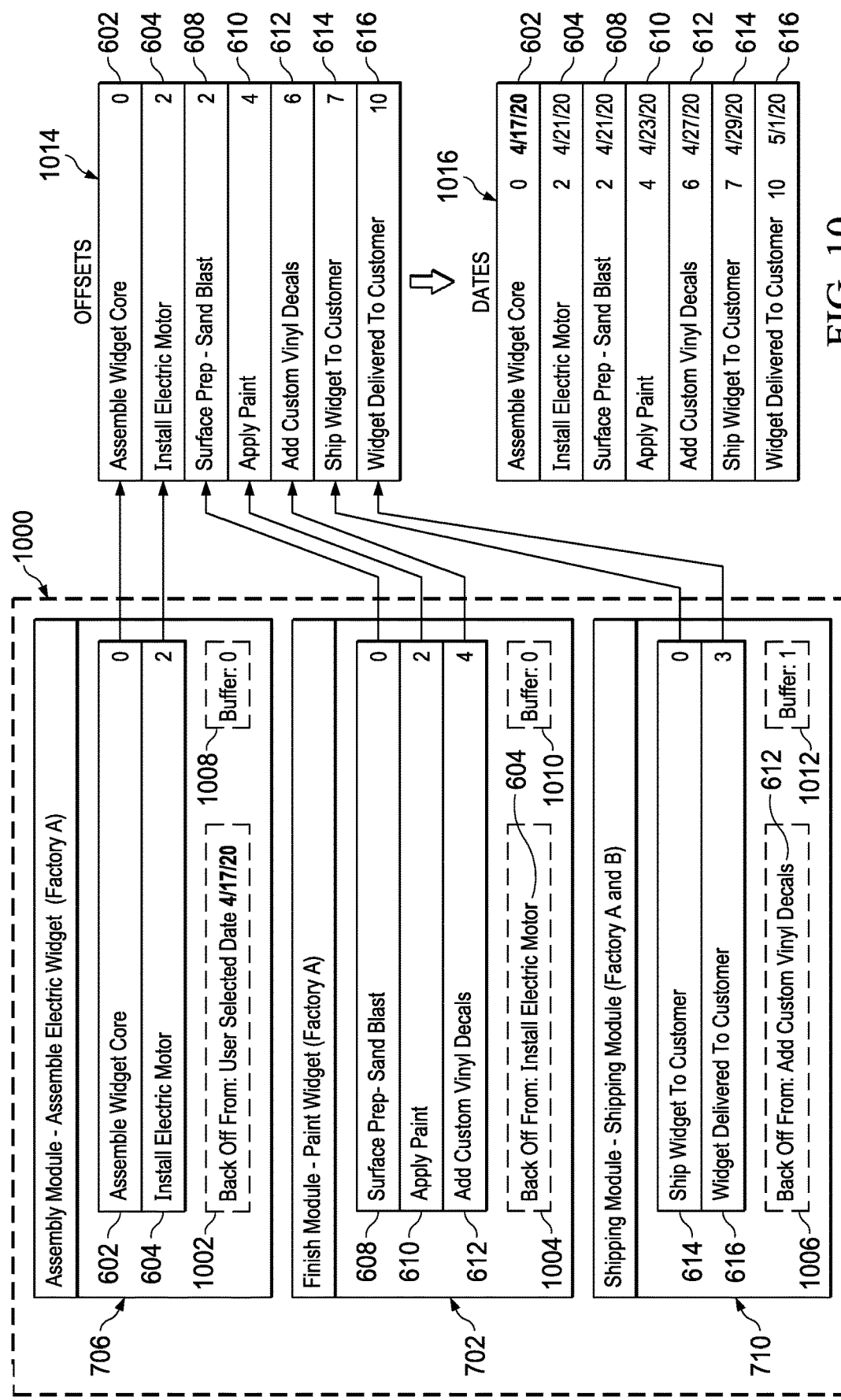
FIG. 10 is an illustration of a process for generating a schedule in accordance with an illustrative embodiment.

Turning to FIG. 10, an illustration of a process for generating a schedule is depicted in accordance with an illustrative embodiment. In this illustrative example, template 1000 is selected for use to generate a schedule. As depicted, template 1000 includes assembly module 706, finish module 702, and shipping module 710.

In illustrative example, the reference date in assembly module 706 is a start date instead of an end date for a project. With this type of reference date, the pointers in the modules and the offsets are changed to provide calculations based on the reference date that is a start date instead of an end date. With this type of reference date as an event, backoff 1002 in assembly module 706 is a user-selected date. Finish module 702 includes backoff 1004 that points to install electric motor 604 in assembly module 706. As depicted, shipping module 710 has backoff 1006 that points to add custom vinyl decals 612 in finish module 702.

In this illustrative example, assembly module 706 has buffer 1008 with an offset of zero; finish module 702 has buffer 1010 with an offset of zero; and shipping module 710 has buffer 1012 with a value of one.

With the backoffs and the buffers set, offsets 1014 are calculated (e.g., by scheduler 130) for the milestones in template 1000. From offsets 1014, dates 1016 are calculated (e.g., by scheduler 130) for each milestone using the date 4/17/20 entered for backoff 1002.

The illustrations of data structures in FIGS. 6-10 are provided for purposes of depicting one manner in which data structures can be implemented for creating schedules. The illustrations of the data structures are not meant to limit the manner in which other examples can be implemented in accordance with an illustrative embodiment. For example, other numbers of milestones other than the milestones shown in these figures can be used. In the illustrative example, eight milestones are depicted. In other illustrative examples, other numbers of milestones can be used such as, for example, 15 milestones, 47 milestones, 220 milestones, 1,900 milestones, or some other number of milestones. Similarly, this illustrative example used 3 modules with a simple linear relationship. Other illustrative examples can use tens or hundreds of modules with relationships forming multiple hierarchies.

Figure 11A:
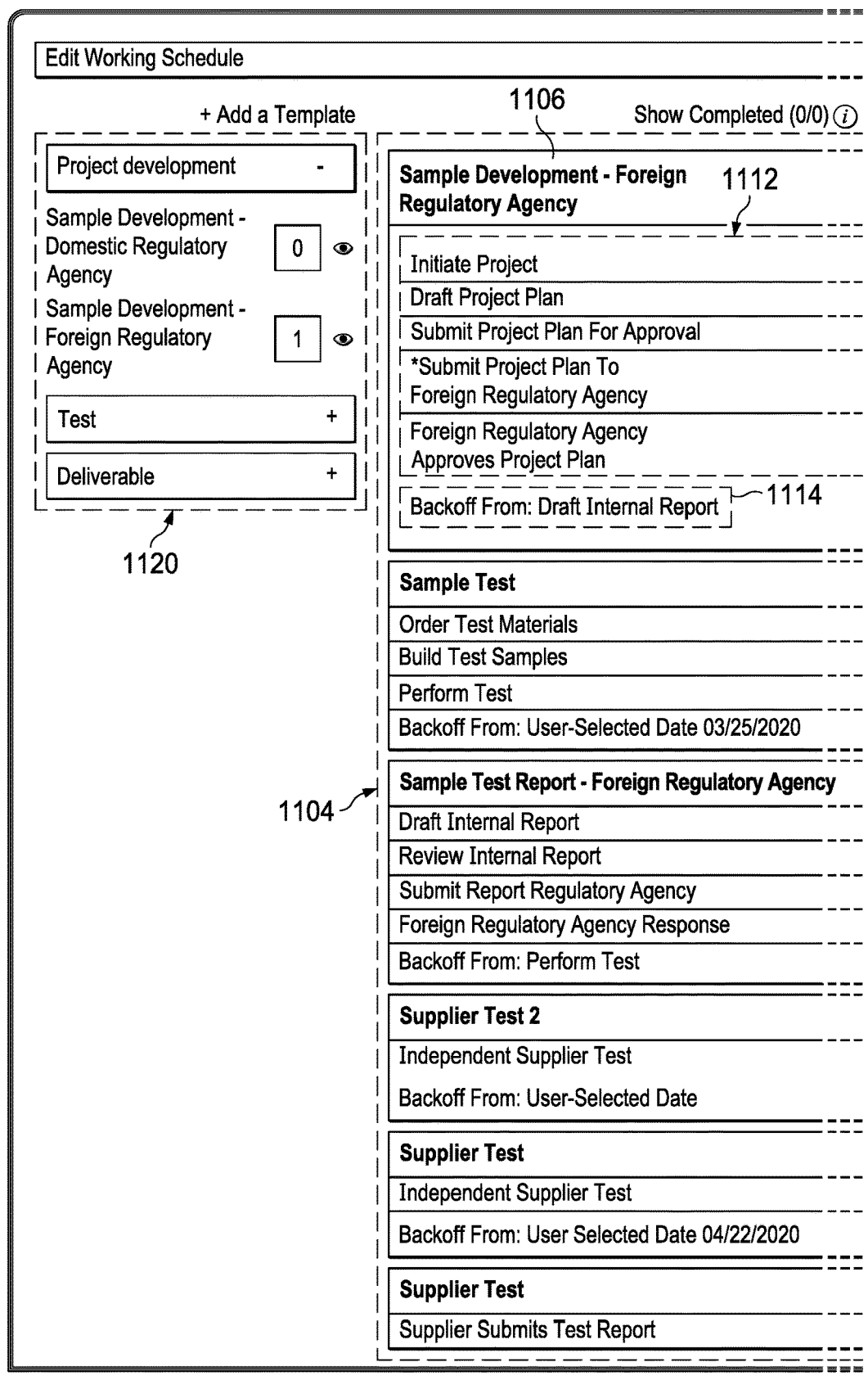
FIGS. 11A-11B are an illustration of a screen displayed for a schedule in accordance with an illustrative embodiment.
Figure 11B:
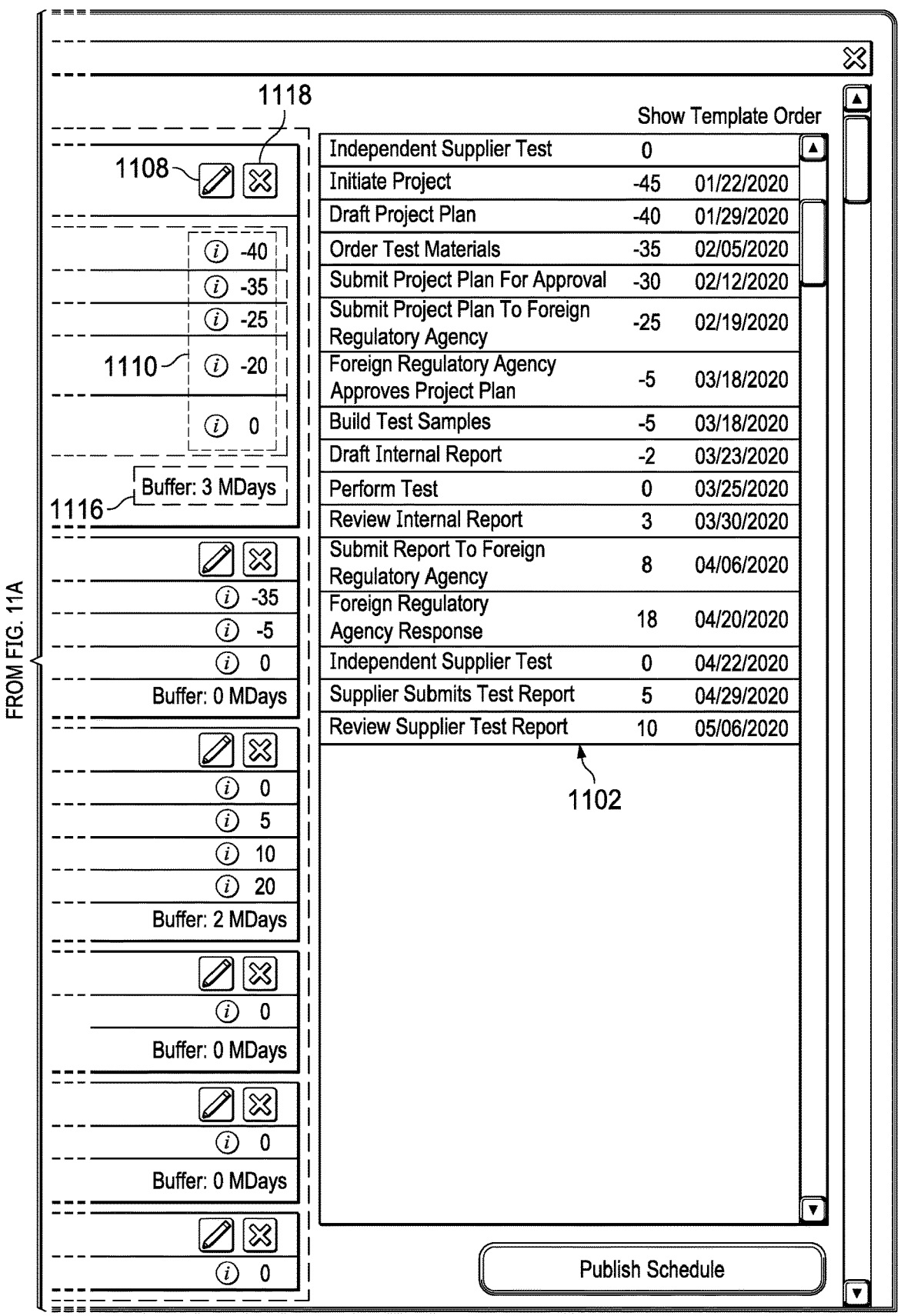

With reference next to FIGS. 11A-11B, an illustration of a screen displayed for a schedule is depicted in accordance with an illustrative embodiment. As depicted, screen 1100 is an example of the screen that can be displayed in graphical user interface 234 on display system 236 in human machine interface 244 in FIG. 2.

As depicted, screen 1100 provides an interface that can be used to create and edit a schedule. In this illustrative example, dates for milestones in schedule 1102 have been calculated from modules 1104.

Each of modules 1104 can be edited or removed in this illustrative example. For example, module 1106 can be edited by selecting edit button 1108. Selection of edit button 1108 enables editing of information in module 1106 such as offsets 1110 for milestones 1112, backoff 1114, and buffer 1116. This module can be removed by selecting delete button 1118. A module can be added to modules 1104 for schedule 1102 from template modules 1120.

Figure 12A:
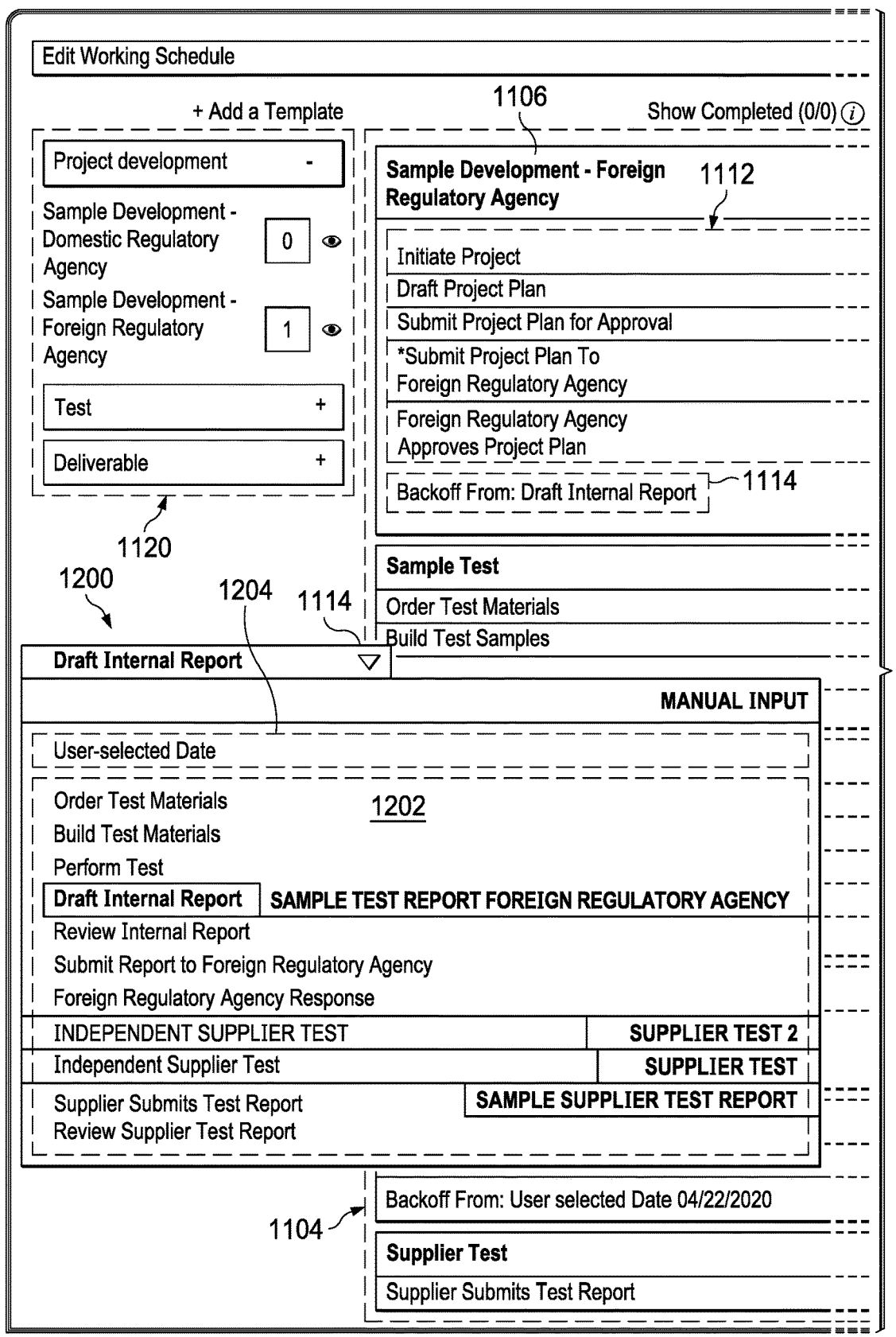
FIGS. 12A-12B are an illustration of a screen displayed for editing a schedule in accordance with an illustrative embodiment.
Figure 12B:
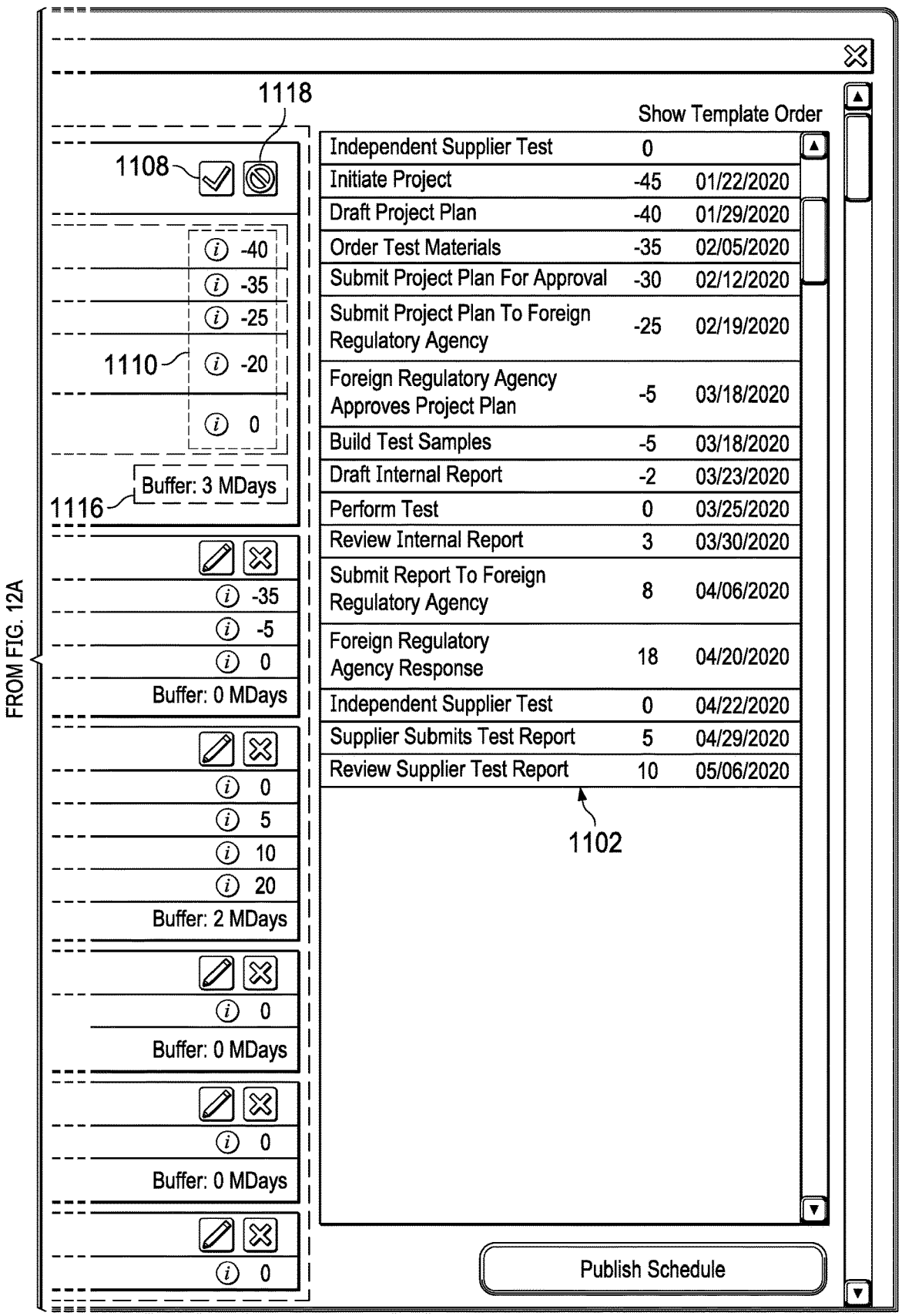

In FIGS. 12A-12B, an illustration of a screen displayed for editing a schedule is depicted in accordance with an illustrative embodiment. In this figure, edit button 1108 in module 1106 has been selected through user input. As depicted, offsets 1110 for milestones 1112, backoff 1114, and buffer 1116 can be edited through user input generated by a human operator.

As depicted, backoff options are displayed in menu 1200. These backoff options include milestones 1202 and user-selected date 1204. A selection of one of milestones 1202 in menu 1200 will replace the current milestone in backoff 1114 with a new milestone. A selection of user-selected date 1204 enables a human operator to select a date.

A change in backoff 1114 results in a recalculation of dates based on the new milestone selected for backoff 1114. Changes to offsets 1110 or removal of milestones 1112 also result in recalculation of dates for schedule 1102.

The illustrations of screens in FIGS. 11A-11B and FIGS. 12A-12B are provided as examples of an interface that can be used to create or edit a schedule by adding, removing, or editing modules and milestones for a schedule. Illustrations of this interface are not meant to limit the manner in which other interfaces can be displayed to a human operator on a human machine interface.

Figure 13:
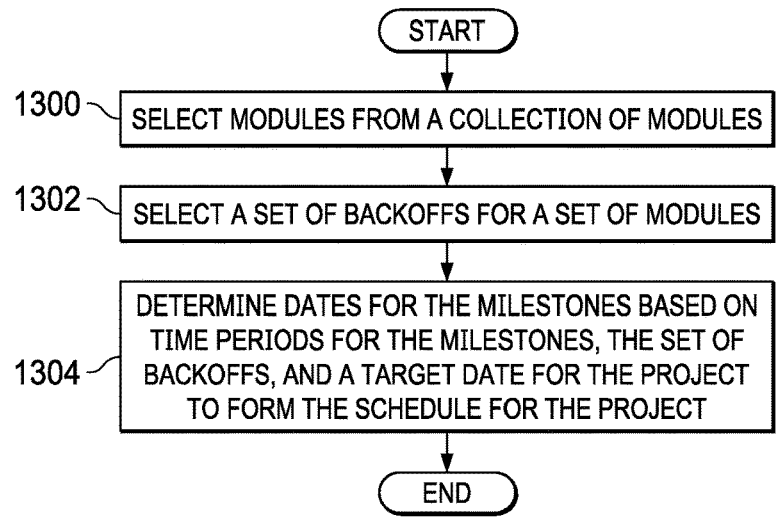
FIG. 13 is an illustration of a flowchart of a process for generating a schedule for a project in accordance with an illustrative embodiment.

Turning next to FIG. 13, an illustration of a flowchart of a process for generating a schedule for a project is depicted in accordance with an illustrative embodiment. The process in FIG. 13 can be implemented in hardware, software, or both. When implemented in software, the process can take the form of program code that is run by one or more processor units located in one or more hardware devices in one or more computer systems. For example, the process can be implemented in scheduler 212 in computer system 210 in FIG. 2.

The process begins by selecting modules from a collection of modules (operation 1300). In operation 1300, a module in the collection of modules has a group of milestones.

The process selects a set of backoffs for a set of modules (operation 1302). A backoff in the set of modules for the module in the set of modules points to a milestone in another module in the modules.

The process determines dates for the milestones based on time periods for the milestones, the set of backoffs, and a reference date for the project to form the schedule for the project (operation 1304). The process terminates thereafter. In other examples, the reference date is a date used to calculate dates for milestones and a start date for the project or a target date for completion of the project.

Figure 14:
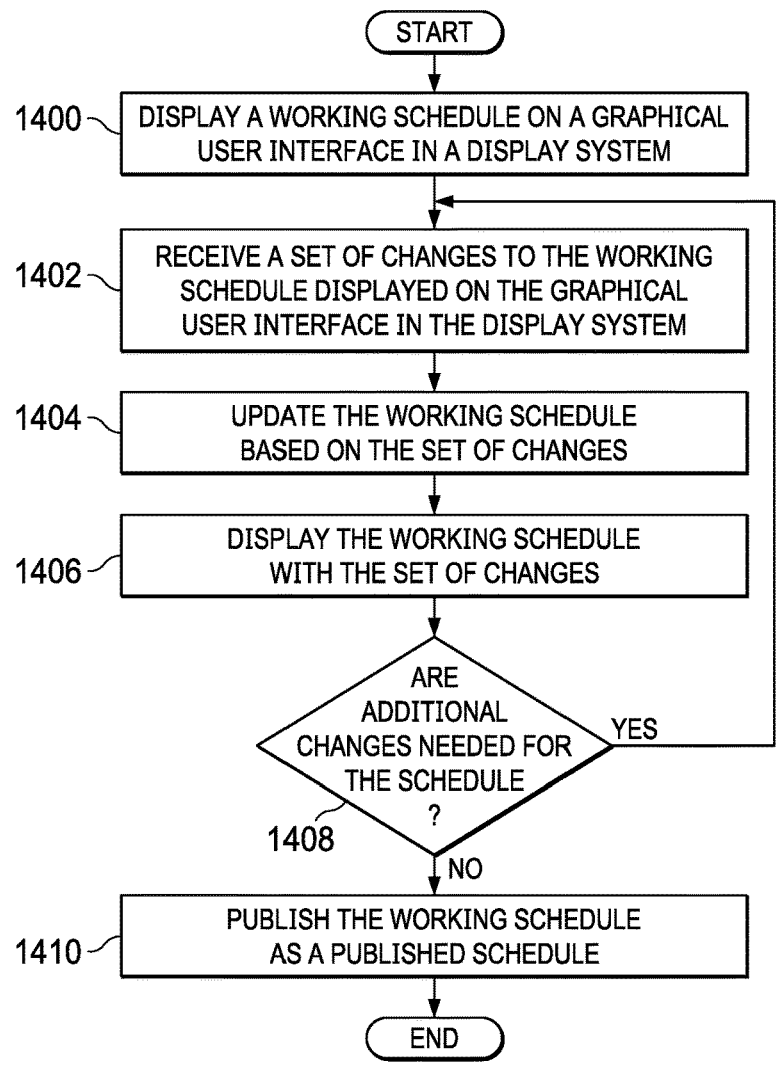
FIG. 14 is an illustration of a flowchart of a process for updating a schedule for a project in accordance with an illustrative embodiment.

With reference to FIG. 14, an illustration of a flowchart of a process for updating a schedule for a project is depicted in accordance with an illustrative embodiment. The process in FIG. 14 can be implemented in hardware, software, or both. When implemented in software, the process can take the form of program code that is run by one or more processor units located in one or more hardware devices in one or more computer systems. For example, the process can be implemented in scheduler 212 in computer system 210 in FIG. 2.

The process begins by displaying a working schedule on a graphical user interface in a display system (operation 1400). The working schedule is a schedule with dates calculated for milestones which have not been approved for use.

The process receives a set of changes to the working schedule displayed on the graphical user interface in the display system (operation 1402). In operation 1402, the set of changes can be selected from at least one of adding a new module, removing a module, removing a milestone, changing a milestone order, changing a time period for the milestone, changing a selected backoff, changing a buffer, changing a reference date, or some other change that can affect dates generated for the schedule.

The process updates the working schedule based on the set of changes (operation 1404). The process then displays the working schedule with the set of changes (operation 1406).

A determination is made as to whether additional changes are needed for the schedule (operation 1408). If additional changes are needed, the process returns to operation 1402. Otherwise, the process publishes the working schedule as a published schedule (operation 1410). The process terminates thereafter. Operation 1410 can occur when a user input is received indicating changes to the working schedule are complete. The published schedule can be used to perform the project.

Figure 15:
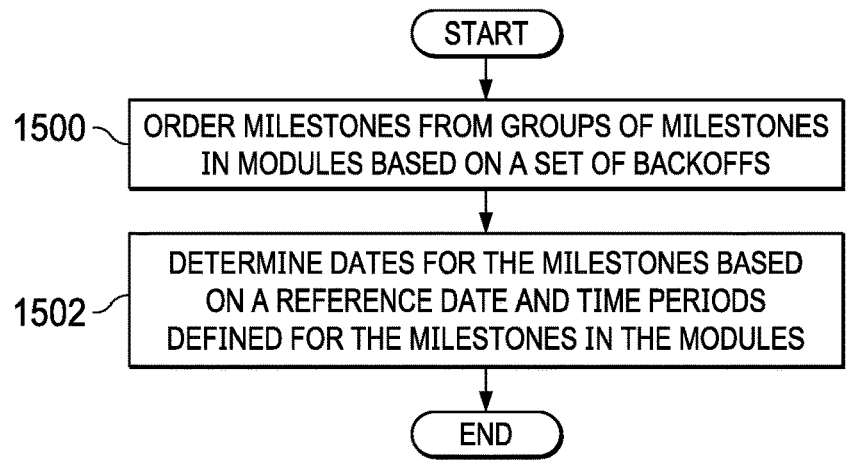
FIG. 15 is an illustration of a flowchart of a process for determining dates for milestones in accordance with an illustrative embodiment.

With reference now to FIG. 15, an illustration of a flowchart of a process for determining dates for milestones is depicted in accordance with an illustrative embodiment. The flowchart in FIG. 15 is an example of one manner in which dates can be determined for milestones in operation 1304 in FIG. 13.

The process begins by ordering milestones from groups of milestones in modules based on a set of backoffs (operation 1500). The process determines dates for the milestones based on a reference date and time periods defined for the milestones in the modules (operation 1502). In step 1502, the time periods are offsets. The process terminates thereafter.

Operation 1502 can also take into account other scheduling data in addition to the reference date. For example, at least one of buffers or other external events in addition or in place of the reference date can be taken into account in operation 1502 to determine the dates for the milestones.

Figure 16:
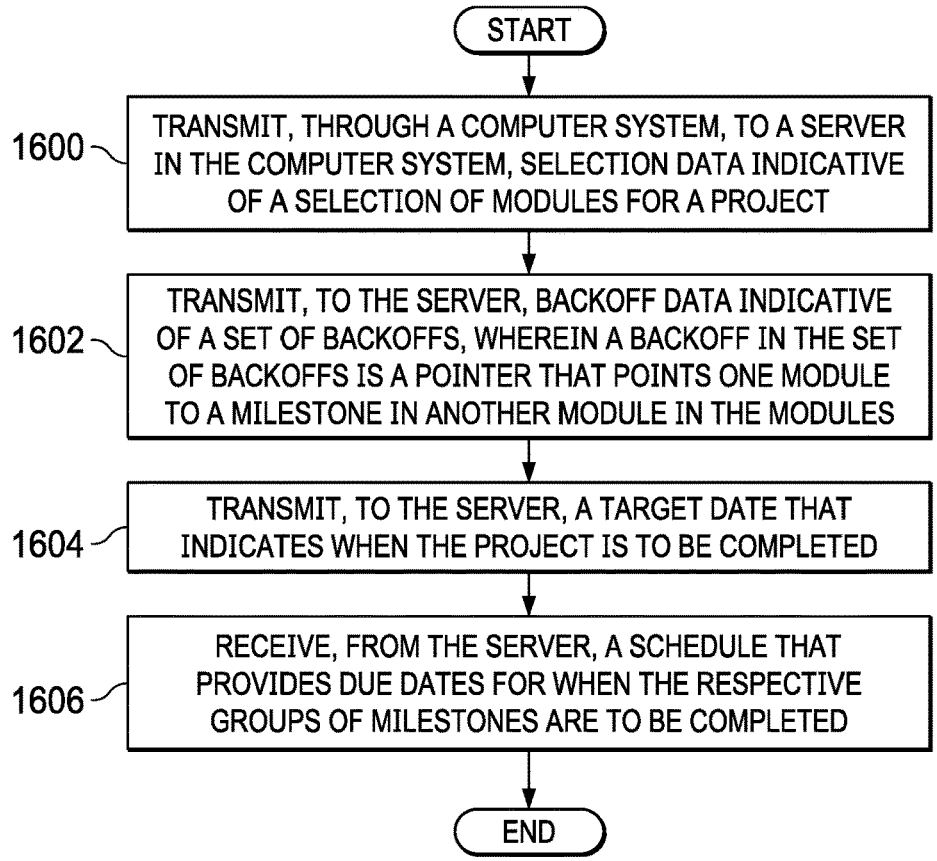
FIG. 16 is an illustration of a flowchart of a process for generating a schedule using a client in accordance with an illustrative embodiment.

Turning next to FIG. 16, an illustration of a flowchart of a process for generating a schedule using a client is depicted in accordance with an illustrative embodiment. The process illustrated in the flowchart in FIG. 16 can be implemented in a client in a computer system. The client can be software running on a computer in a computer system.

For example, the client can be client 131 in the form of browser 132 in client computer 116 in FIG. 1 that communicates with a server to generate a schedule. The server is software in this example and can be server 129 in the form of scheduler 130 in server computer 104. The client and server can be on the same computer in the computer system or a different computer in the computer system.

The process begins with a client in a computer system transmitting, to a server in a computer system, selection data indicative of a selection of modules for a project (operation 1600). The modules in step 1600 include respective groups of milestones. In other words, each module in the modules can include one or more milestones.

The client transmits, to the server, backoff data indicative of a set of backoffs, wherein a backoff in the set of backoffs is a pointer that points one module to a milestone in another module in the modules (operation 1602).

The client transmits, to the server, a target date that indicates when the project is to be completed (operation 1604). The client receives, from the server, a schedule that provides due dates for when the respective groups of milestones are to be completed (operation 1606). The schedule is generated by the server based on the selection of the module, the set of backoffs, and the target date. The process terminates thereafter.

Figure 17:
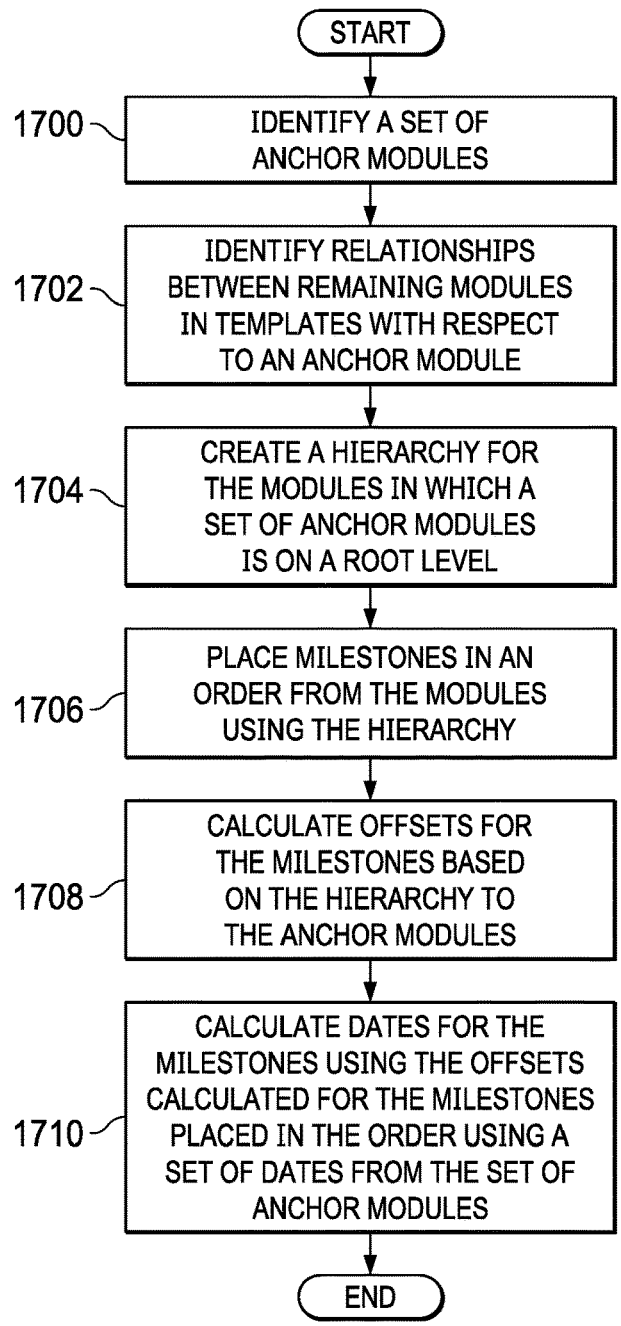
FIG. 17 is an illustration of a flowchart of a process for determining dates for a schedule from modules in accordance with an illustrative embodiment.

With reference next to FIG. 17, an illustration of a flowchart of a process for determining dates for a schedule from modules is depicted in accordance with an illustrative embodiment. The process in FIG. 17 can be implemented in hardware, software, or both. When implemented in software, the process can take the form of program code that is run by one or more processor units located in one or more hardware devices in one or more computer systems. For example, the process can be implemented in scheduler 212 in computer system 210 in FIG. 2. This process can be performed using a template, such as template 800 in FIGS. 8-9 or template 1000 in FIG. 10.

The process begins by identifying a set of anchor modules (operation 1700). An anchor module is a module that does not rely on other modules in generating the schedule. The anchor module can have a backoff referring to an external event, such as an external milestone. Alternatively, the backoff in the anchor module can be a user-selected date. A template can have more than one anchor module in the illustrative example. Each independent module or connected group of modules has one anchor module.

The process then identifies relationships between remaining modules in templates with respect to an anchor module (operation 1702). These relationships can have a hierarchy in which the anchor modules are in the root level. The determination of these relationships can be formed using a recursive join in which successive levels of modules are determined from the root level containing the set of anchor modules.

The process creates a hierarchy for the modules in which a set of the anchor modules is on a root level (operation 1704).

The process places milestones in an order from the modules using the hierarchy (operation 1706). The process calculates offsets for the milestones based on the hierarchy to the anchor modules (operation 1708). In operation 1708, these offsets are relative offsets calculated based on the position of the modules in the hierarchy relative to the anchor modules.

The process then calculates dates for the milestones using the offsets calculated for the milestones placed into order using a set of dates from the set of anchor modules (operation 1710). The process terminates thereafter. In operation 1710, the dates in the anchor modules are zero offset dates such as those from external dates or user-selected dates.

Figure 18:
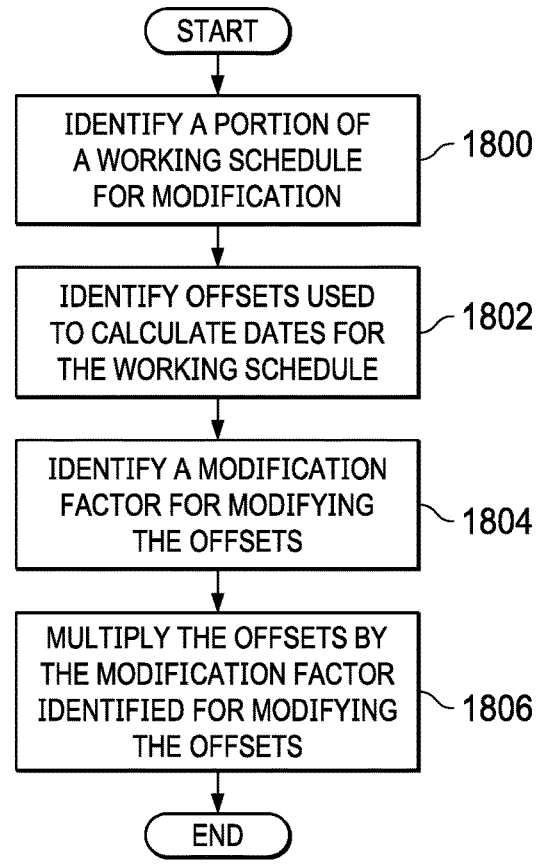
FIG. 18 is an illustration of a flowchart of a process for modifying offsets to a schedule in accordance with an illustrative embodiment.

Turning now to FIG. 18, an illustration of a flowchart of a process for modifying offsets to a schedule is depicted in accordance with an illustrative embodiment. The process in FIG. 18 can be implemented in hardware, software, or both. When implemented in software, the process can take the form of program code that is run by one or more processor units located in one or more hardware devices in one or more computer systems. For example, the process can be implemented in scheduler 212 in computer system 210 in FIG. 2. This process can be used to modify offsets such as offsets 900 in FIG. 9 or to modify dates in a schedule of dates 902 in FIG. 9. In this illustrative example, the dates are for a working schedule. The process can compress or expand offsets 900 in FIG. 9.

The process begins by identifying a portion of a working schedule for modification (operation 1800). The portion can be for all of the offsets in the working schedule or the portion can be for the offsets in a number of modules in the working schedule. The process identifies offsets used to calculate dates for the working schedule (operation 1802).

The process identifies a modification factor for modifying the offsets (operation 1804). The modification factor can be selected to compress or expand the offsets.

For example, if a compression is to be made, the modification factor could be a 50 percent compression in which the offsets are multiplied by 0.5. As another example, the modification factor can be a 200 percent expansion of the offsets. In this illustrative example, the offsets are multiplied by two.

The process multiplies the offsets by the modification factor identified for modifying the offsets (operation 1806). The process terminates thereafter.

This modification factor can be used, for example, in a scenario in which a supplier part shortage causes a part for a test to be received later than the normal testing module flow allows for testing of a part. In this case, the module for a test specimen preparation and the module for testing can require a compressed flow to support successful on-time testing. The overall flow time of the module can be compressed by applying a modification factor, such as 50%, to the offsets of the effected modules. In another example, in which a new employee is training, if the overall schedule permits, the offsets could be expanded by a percentage, such as 130%, in order to allow the new employee additional time to perform the milestones in the module that the new employee is responsible for.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation can take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks can occur out of the order noted in the figures. For example, in some cases, two blocks shown in succession can be performed substantially concurrently, or the blocks can sometimes be performed in the reverse order, depending upon the functionality involved. Also, other blocks can be added in addition to the illustrated blocks in a flowchart or block diagram.

Figure 19:
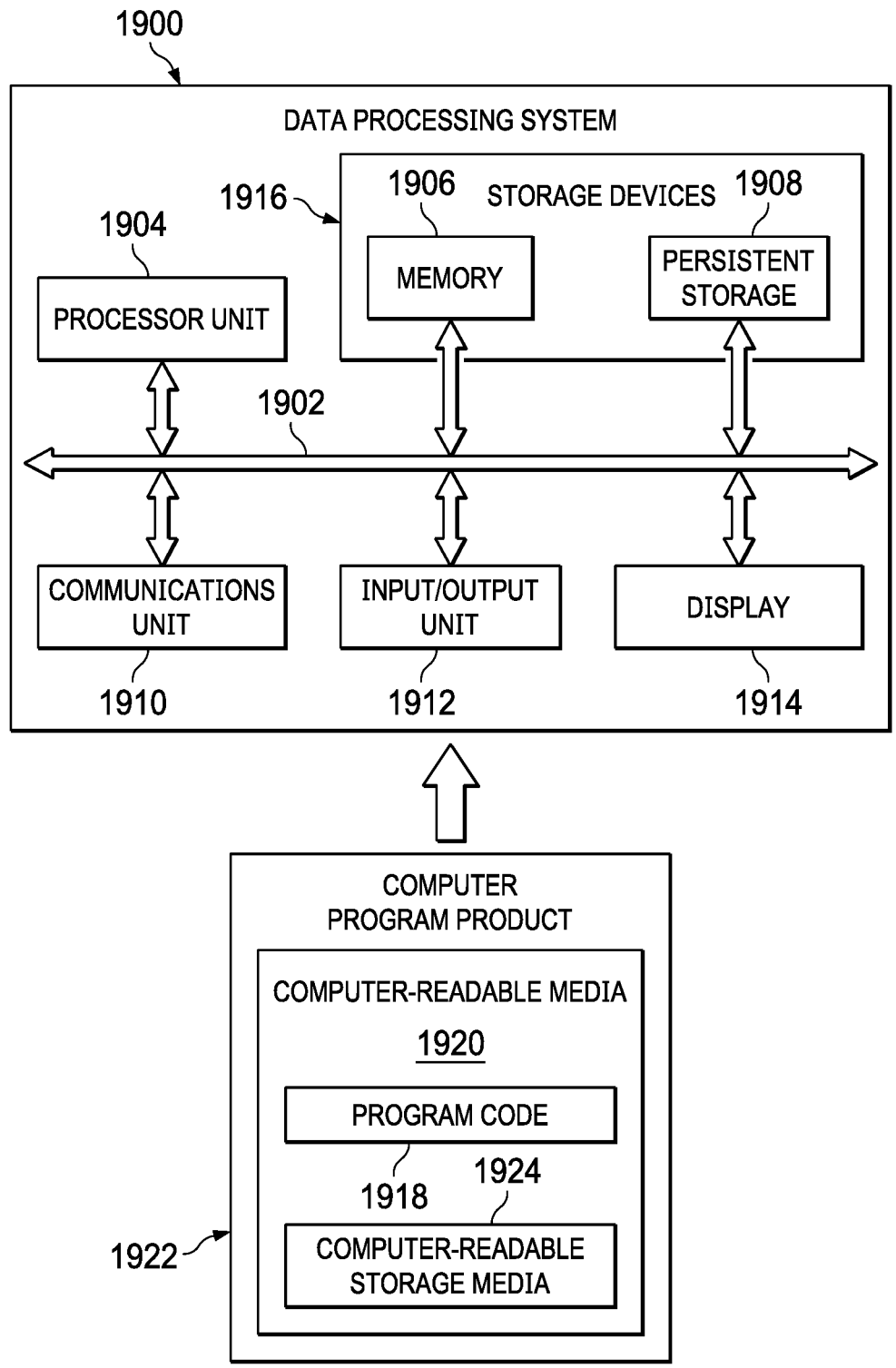
FIG. 19 is an illustration of a block diagram of a data processing system in accordance with an illustrative embodiment.

Turning now to FIG. 19, an illustration of a block diagram of a data processing system is depicted in accordance with an illustrative embodiment. Data processing system 1900 can be used to implement server computer 104, server computer 106, client devices 110, in FIG. 1. Data processing system 1900 can also be used to implement computer system 210 in FIG. 2. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 can also be referred to as computer-readable storage devices in these illustrative examples. Memory 1906, in these examples, can be, for example, a random-access memory or any other suitable volatile or non-volatile storage device. Persistent storage 1908 can take various forms, depending on the particular implementation.

For example, persistent storage 1908 can contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 can provide a connection for user input through at least one of a keyboard, a mouse, or some other suitable input device. Further, input/output unit 1912 can send output to a printer. Display 1914 provides a mechanism to display information to a user.

Instructions for at least one of the operating system, applications, or programs can be located in storage devices 1916, which are in communication with processor unit 1904 through communications framework 1902. The processes of the different embodiments can be performed by processor unit 1904 using computer-implemented instructions, which can be located in a memory, such as memory 1906.

These instructions are referred to as program code, computer usable program code, or computer-readable program code that can be read and executed by a processor in processor unit 1904. The program code in the different embodiments can be embodied on different physical or computer-readable storage medium, such as memory 1906 or persistent storage 1908.

Program code 1918 is located in a functional form on computer-readable medium 1920 that is selectively removable and can be loaded onto or transferred to data processing system 1900 for execution by processor unit 1904. Program code 1918 and computer-readable medium 1920 form computer program product 1922 in these illustrative examples. In the illustrative example, computer-readable medium 1920 is computer-readable storage medium 1924.

In these illustrative examples, computer-readable storage medium 1924 is a physical or tangible storage device used to store program code 1918 rather than a medium that propagates or transmits program code 1918. Computer readable storage medium 1918, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1918 can be transferred to data processing system 1900 using a computer-readable signal media. The computer-readable signal media can be, for example, a propagated data signal containing program code 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1920" can be singular or plural. For example, program code 1918 can be located in computer-readable media 1920 in the form of a single storage device or system. In another example, program code 1918 can be located in computer-readable media 1920 that is distributed in multiple data processing systems. In other words, some instructions in program code 1918 can be located in one data processing system while other instructions in in program code 1918 can be located in one data processing system. For example, a portion of program code 1918 can be located in computer-readable media 1920 in a server computer while another portion of program code 1918 can be located in computer-readable media 1920 located in a set of client computers.

The different components illustrated for data processing system 1900 are not meant to provide architectural limitations to the manner in which different embodiments can be implemented. In some illustrative examples, one or more of the components can be incorporated in or otherwise form a portion of, another component. For example, memory 1906, or portions thereof, can be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program code 1918.

Figure 20:
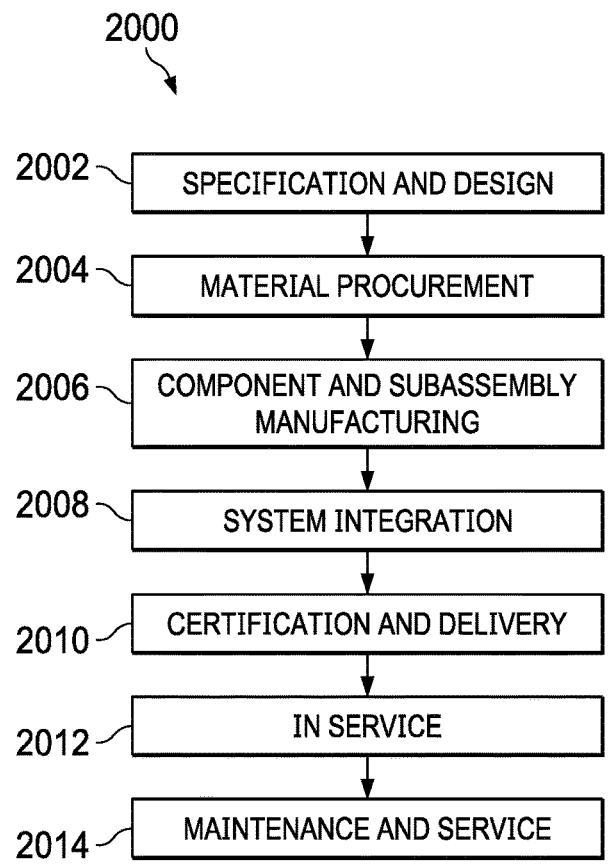
FIG. 20 is an illustration of an aircraft manufacturing and service method in accordance with an illustrative embodiment.
Figure 21:
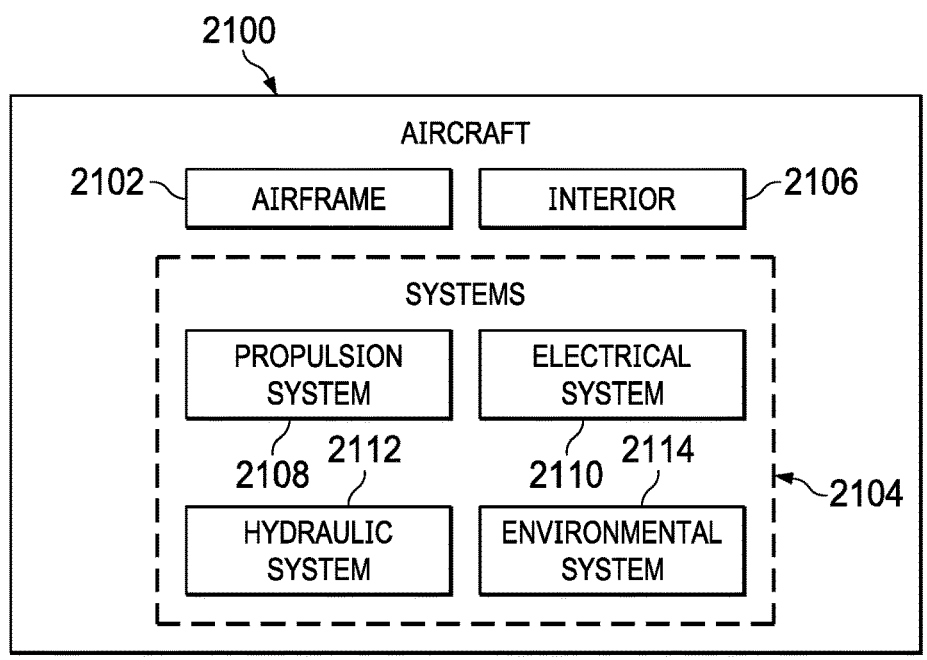
FIG. 21 is an illustration of a block diagram of an aircraft in which an illustrative embodiment may be implemented.

Illustrative embodiments of the disclosure can be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 can include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which can include modification, reconfiguration, refurbishment, and other maintenance or service.

Each of the processes of aircraft manufacturing and service method 2000 can be performed or carried out by a system integrator, a third party, an operator, or some combination thereof. In these examples, the operator can be a customer. For the purposes of this description, a system integrator can include, without limitation, any number of aircraft manufacturers and major-system subcontractors; a third party can include, without limitation, any number of vendors, subcontractors, and suppliers; and an operator can be an airline, a leasing company, a military entity, a service organization, and so on.

With reference now to FIG. 21, an illustration of an aircraft is depicted in which an illustrative embodiment can be implemented. In this example, aircraft 2100 is produced by aircraft manufacturing and service method 2000 in FIG. 20 and can include airframe 2102 with plurality of systems 2104 and interior 2106. Examples of systems 2104 include one or more of propulsion system 2108, electrical system 2110, hydraulic system 2112, and environmental system 2114. Any number of other systems can be included. Although an aerospace example is shown, different illustrative embodiments can be applied to other industries, such as the automotive industry.

Apparatuses and methods embodied herein can be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof can be utilized while aircraft 2100 is in service 2012, during maintenance and service 2014 in FIG. 20, or both. The use of a number of the different illustrative embodiments can substantially expedite the assembly of aircraft 2100, reduce the cost of aircraft 2100, or both expedite the assembly of aircraft 2100 and reduce the cost of aircraft 2100.

For example, scheduler 212 can be used to generate schedules to manufacture and maintain aircraft 2100. In illustrative example, scheduler 212 can be used to generate schedules during at least one of specification and design 2002 of aircraft 2100; material procurement 2004; component and subassembly manufacturing 2006; system integration 2008; certification and delivery 2010; or maintenance and service 2014.

Figure 22:
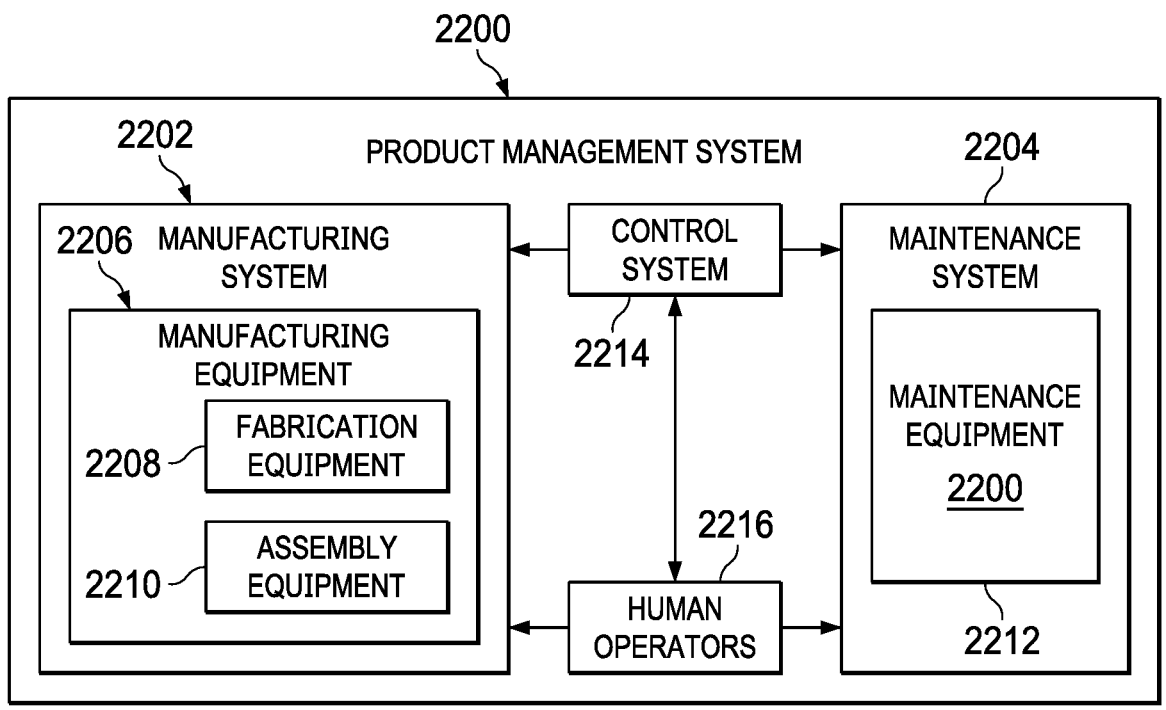
FIG. 22 is an illustration of a block diagram of a product management system is depicted in accordance with an illustrative embodiment.

Turning now to FIG. 22, an illustration of a block diagram of a product management system is depicted in accordance with an illustrative embodiment. Product management system 2200 is a physical hardware system. In this illustrative example, product management system 2200 includes at least one of manufacturing system 2202 or maintenance system 2204.

Manufacturing system 2202 is configured to manufacture products, such as aircraft 2100 in FIG. 21. As depicted, manufacturing system 2202 includes manufacturing equipment 2206. Manufacturing equipment 2206 includes at least one of fabrication equipment 2208 or assembly equipment 2210.

Fabrication equipment 2208 is equipment that used to fabricate components for parts used to form aircraft 2100 in FIG. 21. For example, fabrication equipment 2208 can include machines and tools. These machines and tools can be at least one of a drill, a hydraulic press, a furnace, a mold, a composite tape laying machine, a vacuum system, a lathe, or other suitable types of equipment. Fabrication equipment 2208 can be used to fabricate at least one of metal parts, composite parts, semiconductors, circuits, fasteners, ribs, skin panels, spars, antennas, or other suitable types of parts.

Assembly equipment 2210 is equipment used to assemble parts to form aircraft 2100 in FIG. 21. In particular, assembly equipment 2210 is used to assemble components and parts to form aircraft 2100 in FIG. 21. Assembly equipment 2210 also can include machines and tools. These machines and tools can be at least one of a robotic arm, a crawler, a faster installation system, a rail-based drilling system, or a robot. Assembly equipment 2210 can be used to assemble parts such as seats, horizontal stabilizers, wings, engines, engine housings, landing gear systems, and other parts for aircraft 2100 in FIG. 21.

In this illustrative example, maintenance system 2204 includes maintenance equipment 2212. Maintenance equipment 2212 can include any equipment needed to perform maintenance on aircraft 2100 in FIG. 21. Maintenance equipment 2212 can include tools for performing different operations on parts on aircraft 2100 in FIG. 21. These operations can include at least one of disassembling parts, refurbishing parts, inspecting parts, reworking parts, manufacturing replacement parts, or other operations for performing maintenance on aircraft 2100 in FIG. 21. These operations can be for routine maintenance, inspections, upgrades, refurbishment, or other types of maintenance operations.

In the illustrative example, maintenance equipment 2212 can include ultrasonic inspection devices, x-ray imaging systems, vision systems, drills, crawlers, and other suitable devices. In some cases, maintenance equipment 2212 can include fabrication equipment 2208, assembly equipment 2210, or both to produce and assemble parts that needed for maintenance.

Product management system 2200 also includes control system 2214. Control system 2214 is a hardware system and can also include software or other types of components. Control system 2214 is configured to control the operation of at least one of manufacturing system 2202 or maintenance system 2204. In particular, control system 2214 can control the operation of at least one of fabrication equipment 2208, assembly equipment 2210, or maintenance equipment 2212.

The hardware in control system 2214 can be implemented using hardware that can include computers, circuits, networks, and other types of equipment. The control can take the form of direct control of manufacturing equipment 2206. For example, robots, computer-controlled machines, and other equipment can be controlled by control system 2214. In other illustrative examples, control system 2214 can manage operations performed by human operators 2216 in manufacturing or performing maintenance on aircraft 2100. For example, control system 2214 can assign tasks, provide instructions, display models, or perform other operations to manage operations performed by human operators 2216. In these illustrative examples, scheduler 212 in FIG. 2 can be implemented in control system 2214 to manage at least one of the manufacturing or maintenance of aircraft 2100 in FIG. 21. For example, schedules generated by scheduler 212 can be used to initiate operations, assign tasks, provide instructions or perform other operations in product management system 2200. For example, schedules can be generated and delivered to human operators 2216 along with work orders, instructions, or other information needed to perform tasks for milestones in the schedules.

In the different illustrative examples, human operators 2216 can operate or interact with at least one of manufacturing equipment 2206, maintenance equipment 2212, or control system 2214. This interaction can occur to manufacture aircraft 2100 in FIG. 21.

Of course, product management system 2200 can be configured to manage other products other than aircraft 2100 in FIG. 21. Although product management system 2200 has been described with respect to manufacturing in the aerospace industry, product management system 2200 can be configured to manage products for other industries. For example, product management system 2200 can be configured to manufacture products for the automotive industry as well as any other suitable industries.

One or more features of the illustrative examples are described in the following clauses. These clauses are examples of features not intended to limit other illustrative examples.

Clause 1.

A schedule generation system comprising:

a display system;

a computer system; and a scheduler in the computer system, wherein the scheduler is configured to:

display a graphical user interface with module information in the display system;

receive user input that select selects modules for a schedule in the module information for a project in which a module in the modules includes a group of milestones; selects a set of backoffs, wherein a backoff in the set of backoffs is a pointer that points one module to a milestone in another module in the modules; that defines a target date for the schedule, wherein the target date indicates when the project is to be completed;
    create the schedule from the modules based on selection of modules, the set of backoffs, and the target date for the schedule; and
    display the schedule in the graphical user interface in the display system.

Clause 2.

The schedule generation system of clause 1, wherein the scheduler is configured to:
    receive additional user input that defines a set of changes to the working schedule displayed on the graphical user interface in the display system;
    update the schedule based on the set of changes received in additional user input to form an updated schedule; and
    display the updated schedule.

Clause 3.

The schedule generation system of clause 1, wherein in creating a schedule from the modules based on selection of modules, the set of backoffs, and the target date for the schedule, the scheduler is configured to:
    create the schedule from the modules based on selection of modules, the set of backoffs, and a set of external events, and the target date for the schedule.

Clause 4.

The schedule generation system of clause 1, wherein the scheduler is configured to:
    receive additional user input defining a buffer that indicates a period of time by which the group of milestones in the module is shifted.

Clause 5.

The schedule generation system of clause 4, wherein in creating the schedule from the modules based on selection of modules, the set of backoffs, and the target date for the schedule, the scheduler is configured to:
    determine dates for the milestones based on the target date and time periods defined for the milestones in the modules and a set of buffers for the modules to form the schedule for the project.

Clause 6.

The schedule generation system of clause 5, wherein the time periods are one of offsets to dates for the milestones or durations of time for the milestones.

Clause 7.

The schedule generation system of clause claim 1, wherein the module in the modules also include tasks for the group of milestones.

Clause 8.

The schedule generation system of clause 1, wherein a milestone in the milestones has a type and wherein all of the milestones in the module in the modules have a same type.

Clause 9.

The schedule generation system of clause 1, wherein the type is one of fabrication, assembly, inspection, testing, finish, and shipping.

Clause 10.

The schedule generation system of clause 1, wherein the project is manufacturing a product, certifying a product as meeting a standard, and performing maintenance.

Clause 11.

The schedule generation system of clause 10, wherein the product is one of an a mobile platform, a stationary platform, a land-based structure, an aquatic-based structure, and a space-based structure, a surface ship, a tank, a personnel carrier, a train, a spacecraft, a space station, a satellite, a submarine, an automobile, a power plant, a bridge, a dam, a house, a manufacturing facility, a building, an engine, a monument for an interior of an aircraft, a braking system, a control system, a fuel system, a hydraulic system, a control surface, a skin panel, a wheel, and a fuel tank.

Clause 12.

A product management system comprising:
    a manufacturing system;
    a control system in communication with the manufacturing system, wherein the control system is configured to:
    identify modules selected for a manufacturing a product, wherein the modules include milestones with time periods and a set of backoffs point that to a set of the modules to a set of milestones in other modules in the modules;
    identify a target date for the manufacturing the product; and
    create a schedule for manufacturing a product using the manufacturing system from modules, the set of backoffs, and the target date.

Clause 13.

The product management system of clause 12, wherein the control system is configured to:
    control manufacturing of the product using the schedule.

Clause 14.

The product management system of clause 12, wherein in controlling manufacturing of the product using the schedule, the control system is configured to:
    control manufacturing of the product by at least one of controlling operation of the manufacturing system or generating instructions to human operators using the schedule.

Clause 15.

The product management system of clause 12, wherein the product is one of an a mobile platform, a stationary platform, a land-based structure, an aquatic-based structure, and a space-based structure, a surface ship, a tank, a personnel carrier, a train, a spacecraft, a space station, a satellite, a submarine, an automobile, a power plant, a bridge, a dam, a house, a manufacturing facility, a building, an engine, a monument for an interior of an aircraft, a braking system, a control system, a fuel system, a hydraulic system, a control surface, a skin panel, a wheel, and a fuel tank.

Clause 16.

A schedule generation system comprising:
    a computer system; and
    a scheduler in the computer system, wherein the scheduler is configured to:
    receive a selection of modules for a project, wherein a module in the modules includes a group of milestones;
    receive a set of backoffs, wherein a backoff in the set of backoffs is a pointer that points one module to a milestone in another module in the modules;
    receive a target date for a schedule, wherein the target date indicates when the project is to be completed; and
    create the schedule from the modules based on selection of modules, the set of backoffs, and the target date.

Clause 17.

The schedule generation system of clause 16, wherein the project is manufacturing a product, certifying the product as meeting a standard, and performing maintenance.

Clause 18.

The schedule generation system of clause 16, wherein the product is one of an a mobile platform, a stationary platform, a land-based structure, an aquatic-based structure, and a space-based structure, a surface ship, a tank, a personnel carrier, a train, a spacecraft, a space station, a satellite, a submarine, an automobile, a power plant, a bridge, a dam, a house, a manufacturing facility, a building, an engine, a monument for an interior of an aircraft, a braking system, a control system, a fuel system, a hydraulic system, a control surface, a skin panel, a wheel, and a fuel tank.

Clause 19.

A schedule generation system comprising:
a display system;
a computer system; and
a client in the computer system, wherein the client is configured to:
transmit, to a server in the computer system, selection data indicative of a selection of modules for a project, wherein the modules include respective groups of milestones;
transmit, to the server, backoff data indicative of a set of backoffs, wherein a backoff in the set of backoffs is a pointer that points one module to a milestone in another module in the modules;
transmit, to the server, a target date that indicates when the project is to be completed; and
receive, from the server, a schedule that provides due dates for when the respective groups of milestones are to be completed, wherein the schedule is generated by the server based on the selection of the modules, the set of backoffs, and the target date.

Clause 20.

The schedule generation system of clause 19, wherein the client and the server are one of a same computer in the computer system or a different computer in the computer system.

Clause 21.

A method for generating a schedule for project, the method comprising:
selecting modules from a collection of modules, wherein a module in the collection of modules has a group of milestones;
selecting a set of backoffs for a set of the modules, wherein a backoff in the set of modules for the module in the set of modules points to a milestone in another module in the modules; and
determining dates for the milestones based on time periods for the milestones, the set of backoffs, and a target date for the project to form the schedule for the project.

Clause 22.

The method of clause 21, wherein the project is manufacturing a product, certifying the product as meeting a standard, and performing maintenance.

Clause 23.

The method of clause 22, wherein the product is one of an a mobile platform, a stationary platform, a land-based structure, an aquatic-based structure, and a space-based structure, a surface ship, a tank, a personnel carrier, a train, a spacecraft, a space station, a satellite, a submarine, an automobile, a power plant, a bridge, a dam, a house, a manufacturing facility, a building, an engine, a monument for an interior of an aircraft, a braking system, a control system, a fuel system, a hydraulic system, a control surface, a skin panel, a wheel, and a fuel tank.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A schedule generation system that comprises:
a computer system that comprises:
    a storage repository that comprises a collection of modules; and
    a scheduler in the computer system, wherein the scheduler is configured to:
        receive a selection of modules for a project selected from the collection of modules, wherein each module in the selection of modules includes a group of milestones;
        receive a set of backoffs, wherein each backoff in the set of backoffs is a pointer that points one module to a milestone in another module in the selection of modules;
        form a template that comprises the selection of modules, wherein each of the selection of modules further comprises;
        at least one of the set of backoffs; and
        at least one buffer to add additional offset dates to the group of milestones;
        receive a reference date for a schedule;
        create the schedule from the template based on the selection of modules, the set of backoffs, the at least one buffer of each of the selection of modules, and the reference date; and
    manufacture a product based upon the schedule created by the scheduler of the computer system by controlling manufacturing equipment using the computer system, wherein each of the milestones has a type and wherein all of the milestones in the module in the modules have a same type,
wherein the schedule is a working schedule and wherein the scheduler is configured to:
display the working schedule on a graphical user interface in a display system;
receive a set of changes to the working schedule displayed on the graphical user interface in the display system;
update the working schedule based on the set of changes to generate an updated working schedule; and
display the updated working schedule comprising a change to at least one of the set of backoffs or the at least one buffer.

2. The schedule generation system of claim 1, wherein the set of changes is selected from at least one of adding a new module, removing a module, removing a milestone, changing a milestone order, changing a time period for the milestone, changing a selected backoff, changing a buffer, or changing a reference date.

3. The schedule generation system of claim 1, wherein the scheduler is configured to:
publish the updated working schedule as a published schedule when a user input is received indicating changes to the working schedule is complete, wherein the published schedule is used to perform the project.

4. The schedule generation system of claim 1, wherein in creating the schedule from the modules based on the selection of modules, the set of backoffs, and the reference date for the schedule, the scheduler is configured to:
order milestones from groups of milestones in the modules based on the set of backoffs; and
determine dates for the milestones based on the reference date and time periods defined for the milestones in the modules.

5. The schedule generation system of claim 1, wherein in creating the schedule from the modules based on the selection of modules, the set of backoffs, and the reference date for the schedule, the scheduler is configured to:
create the schedule from the modules based on the selection of modules, the set of backoffs, and a set of external events, and the reference date for the schedule.

6. The schedule generation system of claim 1, wherein the scheduler is configured to:
receive a buffer that indicates a period of time by which the group of milestones in each module in the selection of modules, respectively shifts.

7. The schedule generation system of claim 6, wherein in creating the schedule from the modules based on the selection of modules, the set of backoffs, and the reference date for the schedule, the scheduler is configured to:
determine dates for the milestones based on the reference date and time periods defined for the milestones in the modules and a set of buffers for the modules to form the schedule for the project.

8. The schedule generation system of claim 1, wherein each module in the selection of modules, respectively comprises:
an order for the group of milestones; and
a group of time periods for the milestones.

9. The schedule generation system of claim 8, wherein the group of time periods are one of offsets to dates for the group of milestones or durations of time for the group of milestones.

10. The schedule generation system of claim 1, wherein each module in the selection of modules, respectively also includes tasks for the group of milestones.

11. The schedule generation system of claim 1, wherein manufacture the product comprises one of: fabrication, assembly, inspection, testing, finish, and shipping.

12. A schedule generation system that comprises:
a computer system that comprises:
a storage repository in the computer system;
a collection of modules in the storage repository;
a plurality of templates in the storage repository; and
a scheduler, wherein the scheduler is configured to:
receive a selection of modules for a project selected from the collection of modules, wherein each module in the selection of modules includes a group of milestones;
receive a set of backoffs, wherein each backoff in the set of backoffs is a pointer that points one module to a milestone in another module in the selection of modules;
form a template that comprises the selection of modules, wherein each module of the selection of modules further comprises:
at least one of the set of backoffs; and
at least one buffer to add additional offset dates to the group of milestones;
receive a reference date for a schedule;
create the schedule from the template based on: the selection of modules, the set of backoffs, the at least one buffer of each of the selection of modules, and the reference date; and
manufacture an aircraft based upon the schedule created by the scheduler of the computer system by controlling manufacturing equipment using the computer system, wherein each of the milestones has a type; and wherein all of the milestones in the module in the modules have a same type,
wherein:
manufacture the aircraft comprises one of: fabrication, assembly, inspection, testing, finish, and shipping;
the schedule is a working schedule; and
the scheduler is further configured to:
display the working schedule on a graphical user interface in a display system;
display a set of changes to the working schedule on the graphical user interface in the display system;
update the working schedule based on the set of changes to generate an updated working schedule; and
display the updated working schedule comprising a change to at least one of the set of backoffs or the at least one buffer.

13. The schedule generation system of claim 12, wherein the set of changes is selected from at least one of: adding a new module, removing a module, removing a milestone, changing a milestone order, changing a time period for the milestone, changing a selected backoff, changing a buffer, or changing a reference date.

14. The schedule generation system of claim 12, wherein the scheduler is further configured to:
publish the updated working schedule as a published schedule when a user input is received indicating changes to the working schedule is complete, wherein the published schedule is used to perform the project.

15. The schedule generation system of claim 12, wherein in creating the schedule from the modules based on the selection of modules, the set of backoffs, and the reference date for the schedule, the scheduler is further configured to:
order milestones from groups of milestones in the modules based on the set of backoffs; and
determine dates for the milestones based on the reference date and time periods defined for the milestones in the modules.

16. The schedule generation system of claim 12, wherein in creating the schedule from the modules based on the selection of modules, the set of backoffs, and the reference date for the schedule, the scheduler is further configured to:
create the schedule from the modules based on the selection of modules, the set of backoffs, and a set of external events, and the reference date for the schedule.

17. The schedule generation system of claim 12, wherein the scheduler is further configured to:
receive a buffer that indicates a period of time by which the group of milestones in each module in the selection of modules, respectively shifts.

18. The schedule generation system of claim 17, wherein the scheduler is further configured to determine dates for the milestones based on:
the reference date and time periods defined for the milestones in the modules; and
a set of buffers for the modules to form the schedule for the project.

19. The schedule generation system of claim 12, wherein each module in the selection of modules, respectively comprises:
an order for the group of milestones; and
a group of time periods for the milestones.

20. The schedule generation system of claim 19, wherein the group of time periods are one of offsets to dates for the group of milestones or durations of time for the group of milestones.

21. The schedule generation system of claim 12, wherein each module in the selection of modules, respectively further comprise tasks for the group of milestones.

\* \* \* \* \*